(12) United States Patent
Kurokawa et al.

(10) Patent No.: US 10,209,422 B2
(45) Date of Patent: Feb. 19, 2019

(54) COHERENT OPTICAL RECEIVER MODULE AND METHOD FOR MANUFACTURING THE SAME

(71) Applicant: Sumitomo Electric Industries, Ltd., Osaka-shi (JP)

(72) Inventors: Munetaka Kurokawa, Osaka (JP); Yasushi Fujimura, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 16/032,523

(22) Filed: Jul. 11, 2018

(65) Prior Publication Data
US 2019/0018179 A1   Jan. 17, 2019

(30) Foreign Application Priority Data

Jul. 14, 2017   (JP) ................ 2017-138156

(51) Int. Cl.
| | | |
|---|---|---|
| G02B 6/293 | (2006.01) |
| F21V 8/00 | (2006.01) |
| G02B 27/09 | (2006.01) |
| G02B 5/30 | (2006.01) |
| G02B 27/30 | (2006.01) |

(52) U.S. Cl.
CPC ......... *G02B 6/0006* (2013.01); *G02B 5/3025* (2013.01); *G02B 27/0955* (2013.01); *G02B 27/30* (2013.01)

(58) Field of Classification Search
None
See application file for complete search history.

(56) References Cited

FOREIGN PATENT DOCUMENTS

JP   2014-187506 A   10/2014

*Primary Examiner* — Elmito Breval
(74) *Attorney, Agent, or Firm* — Venable LLP; Michael A. Sartori; Miguel A. Lopez

(57) ABSTRACT

A coherent optical receiver module is disclosed. The module includes a housing, an optical fiber group, a first optical element, and a second optical element. The housing stores a first optical component disposed on an optical path of a local beam and a second optical component disposed on an optical path of a signal beam. The optical fiber group includes a first optical fiber optically coupled to the first optical component and a second optical fiber optically coupled to the second optical component. The first optical element has a first lens disposed on the optical path of the local beam, and transmits the signal beam and the local beam. The second optical element has a second lens disposed on the optical path of the signal beam, and transmits the signal beam and the local beam. The first optical element and the second optical element are placed side by side between the optical fiber group and one end surface of the housing.

15 Claims, 18 Drawing Sheets

COHERENT OPTICAL RECEIVER MODULE AND METHOD FOR MANUFACTURING THE SAME

CROSS-REFERENCE TO RELATED APPLICATION

The present application is based on and claims benefits of priority to Japanese Patent Application No. 2017-138156 filed on Jul. 14, 2017; entire contents of which are incorporated herein by reference.

TECHNICAL FIELD

The present invention relates to a coherent optical receiver module and a method for manufacturing the same.

BACKGROUND OF INVENTION

Japanese Patent Publication No. JP-2014-187506A discloses an optical receiver module to be used for coherent optical communication. The housing of the module is provided with connectors, which are placed side by side, connected to a single mode optical fiber (SMF) for introducing a signal beam and a polarization maintaining optical fiber (PMF) for introducing a local beam, respectively.

SUMMARY OF INVENTION

An aspect of the present invention relates to a coherent optical receiver module for demodulating information included in a phase-modulated signal beam by causing a local beam to interfere with the signal beam. The coherent optical receiver module comprises a housing, an optical fiber group, a first optical element, and a second optical element. The housing has one end surface that intersects a first direction. The housing stores a first optical component disposed on an optical path of the local beam and a second optical component disposed on an optical path of the signal beam therein. The optical fiber group is disposed to face the end surface. The optical fiber group includes a first optical fiber that is optically coupled to the first optical component to propagate the local beam, and a second optical fiber that is optically coupled to the second optical component to propagate the signal beam. The first optical element has a first lens disposed on the optical path of the local beam outputted from the first optical fiber. The first optical element is configured to transmit the signal beam and the local beam therethrough. The second optical element has a second lens disposed on the optical path of the signal beam outputted from the second optical fiber. The second optical element is configured to transmit the signal beam and the local beam therethrough. The first optical element and the second optical element are placed side by side along the first direction between the optical fiber group and the one end surface.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION

Figure 1:
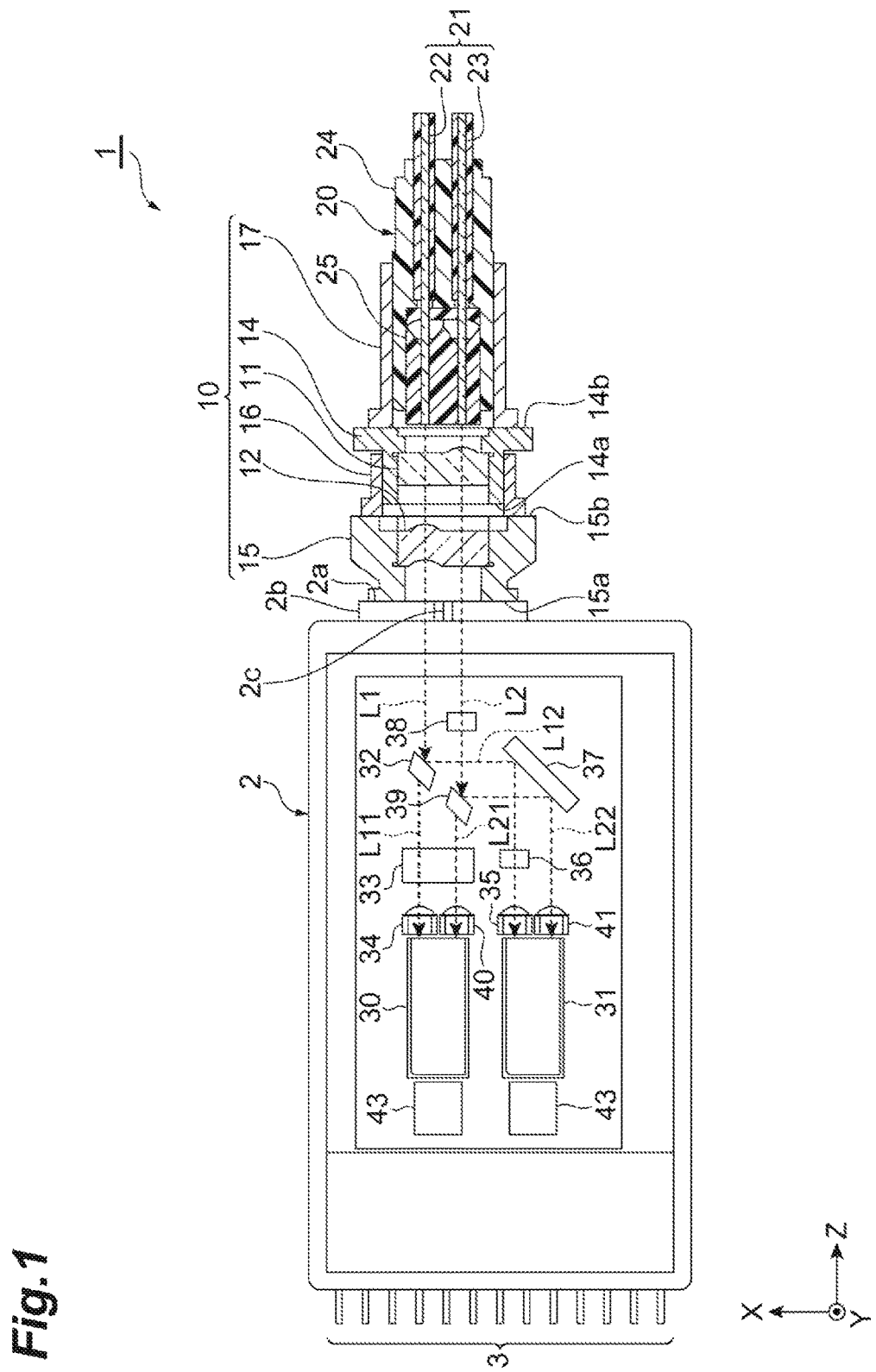
FIG. 1 is a partial cross-sectional view illustrating the configuration of a coherent optical receiver module of one embodiment.

Problems to be Solved by the Present Disclosure

An optical receiver module disclosed in JP2014-187506 is provided with two lens in the inside of connectors (optical input ports) connected to two optical fibers, which are the SMF and the PMF. The two lens optically couples a signal beam outputted from the SMF and a local beam outputted from the PMF to corresponding optical components in the housing, respectively. In recent years, miniaturization of an optical receiver module for coherent optical communication is required. The above structure that provides two lenses separately for the two optical fibers prohibits the optical receiver module from downsizing it because of the external size of each optical input port. Hence, it is conceivable to place two lenses as a lens array in one optical input port and place two optical fibers as an optical fiber array corresponding to the lens array.

This structure, however, may misalign the interval between the optical axes of the respective lenses of the lens array and the interval between the cores of the respective optical fibers of the optical fiber array from each other due to, for example, manufacturing variability. This misalignment may decrease the coupling efficiency between the signal beam and/or local beam passed through the respective lenses and the optical components in the housing may decrease. In addition, if the two lenses are integrated into a lens array, the positions of the lenses cannot be adjusted individually in manufacturing the optical receiver module, and consequently it is difficult to precisely align each of the lenses. It is conceivable to draw the optical fibers into the inside of the housing, but this structure may cause a decrease in productivity and is likely more expensive because special processing is required for the optical fibers.

Effect of the Present Disclosure

According to the coherent optical receiver module of the present disclosure and the method for manufacturing the same, it is possible to downsize the coherent optical receiver module while reducing decrease in optical coupling efficiency.

DESCRIPTION OF EMBODIMENT OF THE PRESENT INVENTION

First, the contents of an embodiment of the present invention will be listed and described. A module according to one embodiment of the present invention is a coherent optical receiver module for demodulating information included in a phase-modulated signal beam by causing a local beam to interfere with the signal beam. The coherent optical receiver module comprises a housing, an optical fiber group, a first optical element, and a second optical element. The housing has one end surface that intersects a first direction. The housing stores a first optical component disposed on an optical path of the local beam and a second optical component disposed on an optical path of the signal beam therein. The optical fiber group is disposed to face the end surface. The optical fiber group includes a first optical fiber that is optically coupled to the first optical component to propagate the local beam, and a second optical fiber that is optically coupled to the second optical component to propagate the signal beam. The first optical element has a first lens disposed on the optical path of the local beam outputted from the first optical fiber. The first optical element is configured to transmit the signal beam and the local beam therethrough. The second optical element has a second lens disposed on the optical path of the signal beam outputted from the second optical fiber. The second optical element is configured to transmit the signal beam and the local beam therethrough. The first optical element and the second optical element are placed side by side along the first direction between the optical fiber group and the one end surface.

In the coherent optical receiver module, the first optical element having the first lens disposed on the optical path of the local beam and the second optical element having the second lens disposed on the optical path of the signal beam are placed side by side along the first direction, the first optical element transmits the signal beam and the local beam, and the second optical element transmits the signal beam and the local beam. Therefore, it is possible to narrow the interval between the optical axis of the first lens and the optical axis of the second lens, and it is possible to constitute one optical coupling system including the first lens and the second lens for the optical fiber group. In other words, the first lens and the second lens can be stored in a single optical input port. Consequently, it is possible to miniaturize the coherent optical receiver module. In addition, the first lens and the second lens are separately provided in the first optical element and the second optical element. Hence, it is possible to align the first lens and the second lens individually in manufacturing the coherent optical receiver module. As a result, decrease in the optical coupling efficiency between the first optical fiber and the first optical component and decrease in the optical coupling efficiency between the second optical fiber and the second optical component can be reduced.

The first and second lenses may be disposed so that optical axes of the first and second lenses misalign with centers of the first and second optical elements. A first region in the first optical element opposite to the first lens with respect to the center of the first optical element may not have a lens and may be located on an extension line of the optical axis of the second lens. A second region in the second optical element opposite to the second lens with respect to the center of the second optical element may not have a lens and may be located on an extension line of the optical axis of the first lens. Thus, alignment of the first lens can be performed without being influenced by the location of the second optical element, and alignment of the second lens can be performed without being influenced by the location of the first optical element. It is therefore possible to further reduce decrease in the optical coupling efficiency between the first optical fiber and the first optical component and decrease in the optical coupling efficiency between the second optical fiber and the second optical component. The first region in the first optical element may define a plane area and may be located on an extension line of the optical axis of the second lens. The second region in the second optical element may define a plane area and may be located on an extension line of the optical axis of the first lens.

The first optical element may be located between the optical fiber group and the second optical element in the first direction.

The second lens may include a meniscus lens. Therefore, even if the distance between the second lens and the optical fiber group in the first direction is longer than the distance between the first lens and the optical fiber group, the size of the beam diameter of the signal beam transmitted through the second lens can be made closer to the size of the beam diameter of the local beam transmitted through the first lens. As a result, decrease in the optical coupling efficiency between the second optical fiber and the second optical component can be further reduced. The second optical element may include an surface facing the end surface of the housing and the surface of the second optical element may be provided with a concave surface of the second lens.

The coherent optical receiver module may further comprise a first holder that holds the first optical element and a second holder that holds the second optical element. The housing may include a bush that arranged adjacent to a side wall of the housing wherein the side wall has a window, and the bush may be provided with the end surface. The first holder may have a first positioning portion on an outer periphery, the second holder may have a second positioning portion on an outer periphery and the bush may have a third positioning portion on an outer periphery. The first positioning portion, the second positioning portion and the third positioning portion may be aligned on a line parallel to the first direction.

The first holder may include a cut or an index plane on an outer periphery, and the second holder may include a cut or an index plane on an outer periphery. The cut or the index plane of the first holder may align with the cut or the index plane of the second holder. The housing may include a bush that arranged adjacent to a side wall of the housing wherein the side wall has a window. The bush may be provided with the end surface, and the bush may include a cut or an index plane on an outer periphery. The cut or the index plane of the first holder, the cut or the index plane of the second holder, and the cut or the index plane of the bush may be aligned on a line parallel to the first direction.

A method according to one embodiment of the present invention is a method for manufacturing a coherent optical receiver module. The method comprises: a step of preparing a housing having one end surface, an optical fiber group including a first optical fiber configured to propagate a local beam and a second optical fiber configured to propagate a signal beam, a first optical element having a first lens, and a second optical element having a second lens; a step of positioning the first optical element between the end surface of the housing and the optical fiber group to align the first lens of the first optical element with an optical axis of the first optical fiber, a step of fixing the first optical element to the optical fiber group; a step of positioning the second optical element between the end surface and the first optical element to align the second lens of the second optical element with an optical axis of the second optical fiber; and a step of fixing the second optical element to the first optical element and the end surface of the housing.

When manufacturing the above-described coherent optical receiver module, the second lens may be aligned after aligning the first lens and fixing the position of the first optical element. The reason is as follows. When aligning the first lens, it may be necessary to rotate the optical fiber group about the center axis for an adjustment of the polarization direction of the local beam. If the second lens is aligned and fixed to the optical fiber group first, when the optical fiber group is rotated about the center axis for the next alignment of the first lens, the position of the second lens may move about the center axis with the rotation. As a result, the position of the optical axis of the aligned second lens may misalign. Therefore, the first optical element is positioned between the optical fiber group and the second optical element to make it possible to align the first lens first and reduce the misalignment of the position of the optical axis of the second lens due to the influence of the alignment of the first lens. Consequently, decrease in the optical coupling efficiency between the second optical fiber and the second optical component can be further reduced.

In the above method, in the step of preparing, a first holder that holds the first optical element therein may be prepared together with the first optical element, and a second holder that holds the second optical element therein may be prepared together with the second optical element. The housing may be provided with a bush adjacent to a side wall of the housing, and the first and second holders and the bush each may have a cut or an index plane. In the step of positioning the first optical element, the cut or the index plane of the first holder may be aligned with the cut or the index plane of the bush, and in the step of positioning the second optical element, the cut or the index plane of the second holder may be aligned with the cut or the index plane of the bush.

DETAILS OF EMBODIMENT OF THE PRESENT INVENTION

Next, some embodiments of the coherent optical receiver module according to the present invention and the method for manufacturing the same will be described below with reference to the drawings. The present invention, however, is not restricted to those embodiments, and has a scope defined in claims and includes all changes, modifications and equivalents derived from the scope of the claims. In the explanations of drawings, numerals or symbols will refer to elements same with or similar to each other without overlapping explanations.

Figure 2:
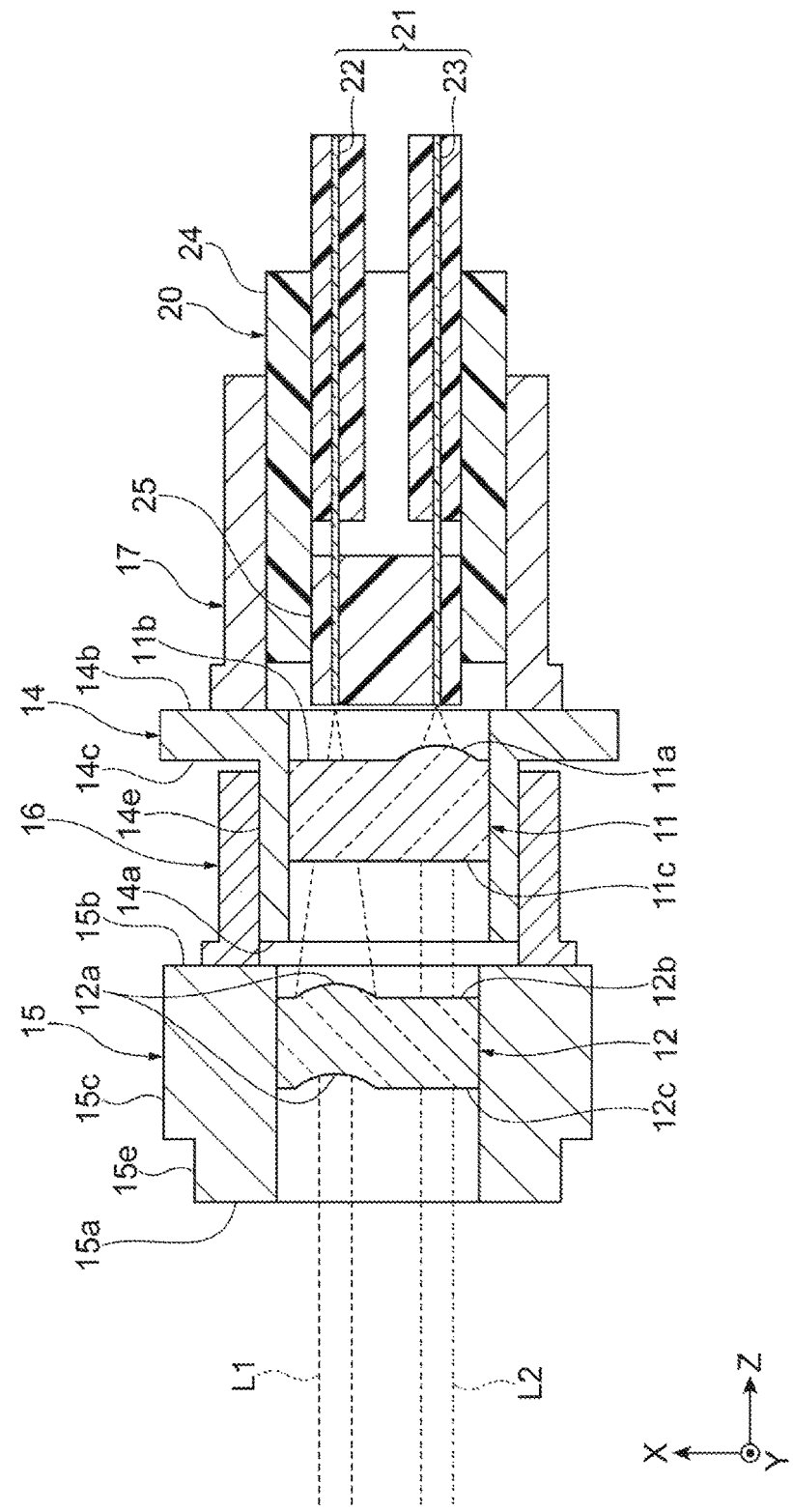
FIG. 2 is a cross-sectional view illustrating an optical plug and a coupling portion.

FIG. 1 is a partial cross-sectional view illustrating a configuration of a coherent optical receiver module 1 (hereinafter referred to as "the optical receiver module 1") according to one embodiment of the present invention. FIG. 2 is a cross-sectional view illustrating an optical plug 20 and a coupling portion 10. In each drawing, the XYZ orthogonal coordinate system is shown to facilitate understanding. In FIG. 1, the connection relationships of optical components inside the optical receiver module 1 are schematically shown. In FIGS. 1 and 2, the coupling portion 10 and the optical plug 20 are shown as the X-Z cross section. The optical receiver module 1 causes a local beam L2 to interfere with a phase-modulated received signal beam L1, and thereby demodulates information included in the signal beam L1. The optical receiver module 1 converts the demodulated information into an electric signal and outputs to the outside of the module 1.

As illustrated in FIG. 1, the optical receiver module 1 includes a substantially rectangular parallelepiped housing 2, the coupling portion 10 fixed to the housing 2, and the optical plug 20 connected to the coupling portion 10. The housing 2 can be made of Kovar, for example. The housing 2 has four side walls. A bush 2b with the Z axis as the center axis is positioned on a side wall having a window among the four side walls of the housing 2. The bush 2b has one end surface 2a intersecting the Z direction. In other words, the one end surface 2a is provided on the bush 2b. The bush 2b protrudes from the side wall with the window toward the outside of the housing 2. A V-cut 2c extending along the Z direction is formed on the outer peripheral surface of the bush 2b. In short, the V-cut 2c is provided on the outer periphery of the bush 2b. The V-cut 2c is provided at one end portion in the Y direction of the bush 2b. A plurality of lead terminals 3 are provided on at least one side wall other than the side wall with the window of the housing 2. The plurality of lead terminals 3 are drawn out from the lowermost layer of a multi-layered ceramics constituting each side wall of the housing 2. The plurality of lead terminals 3 include a terminal for taking out an electric signal generated from the signal beam L1 to the outside of the optical receiver module 1, a terminal for supplying a bias to an electronic circuit inside the housing 2, a ground terminal, etc.

The optical plug 20 extends along the Z direction and is disposed to face the one end surface 2a of the bush 2b. The optical plug 20 has a fiber unit 21, a ferrule 24, and a capillary 25. The fiber unit 21 includes a single mode fiber (SMF) 22 and a polarization maintaining fiber (PMF) 23. The SMF 22 and the PMF 23 extend in the Z direction and are placed side by side along the X direction. The SMF 22 propagates the signal beam L1 and outputs the signal beam L1 to the coupling portion 10. The PMF 23 propagates the local beam L2 and outputs the local beam L2 to the coupling portion 10. The signal beam L1 and the local beam L2 are inputted into the housing 2 through the coupling portion 10. The ferrule 24 has a cylindrical shape with the Z direction as the center axis direction. The ferrule 24 stores an end portion of each of the SMF 22 and the PMF 23. The capillary 25 is inserted into the ferrule 24 and holds the end portions of the SMF 22 and the PMF 23.

The coupling portion 10 has a cylindrical shape extending along the Z direction. One end of the coupling portion 10 in the Z direction is joined to the one end surface 2a of the bush 2b. The other end of the coupling portion 10 is connected to the optical plug 20. The coupling portion 10 has a first optical element 11, a second optical element 12, a first lens holder 14, a second lens holder 15, a coupling sleeve 16, and a aligning sleeve 17. Each of the first optical element 11 and the second optical element 12 has a columnar shape with the center axis of the ferrule 24 as its center axis. The first optical element 11 and the second optical element 12 are placed side by side along the Z direction between the one end surface 2a of the bush 2b and the fiber unit 21.

The first optical element 11 is provided between the fiber unit 21 and the second optical element 12 in the Z direction, and is disposed on an optical path of the signal beam L1 outputted from the SMF 22 and on an optical path of the local beam L2 outputted from the PMF 23. The first optical element 11 transmits the signal beam L1 and the local beam L2. The first optical element 11 has a first lens 11a positioned on the optical path of the local beam L2, a front facet 11b facing the fiber unit 21, and an rear facet 11c located opposite to the front facet 11b (see FIG. 2). The first lens 11a is a convex lens located on the front facet 11b. The first lens 11a converts the local beam L2 into collimated light.

The second optical element 12 is provided between the first optical element 11 and the bush 2b in the Z direction and disposed on the optical path of the signal beam L1 outputted from the SMF 22 and the an optical path of the local beam L2 outputted from the PMF 23. The second optical element 12 transmits the signal beam L1 and the local beam L2. The second optical element 12 has a second lens 12a positioned on the optical path of the signal beam L1, an front facet 12b facing the front facet 11b, and an rear facet 12c located opposite to the front facet 12b (see FIG. 2). The second lens 12a may be a meniscus lens including a convex surface formed on the front facet 12b and a concave surface formed on the rear face 12c. The second lens 12a converts the signal beam L1 into collimated light.

Figure 3:
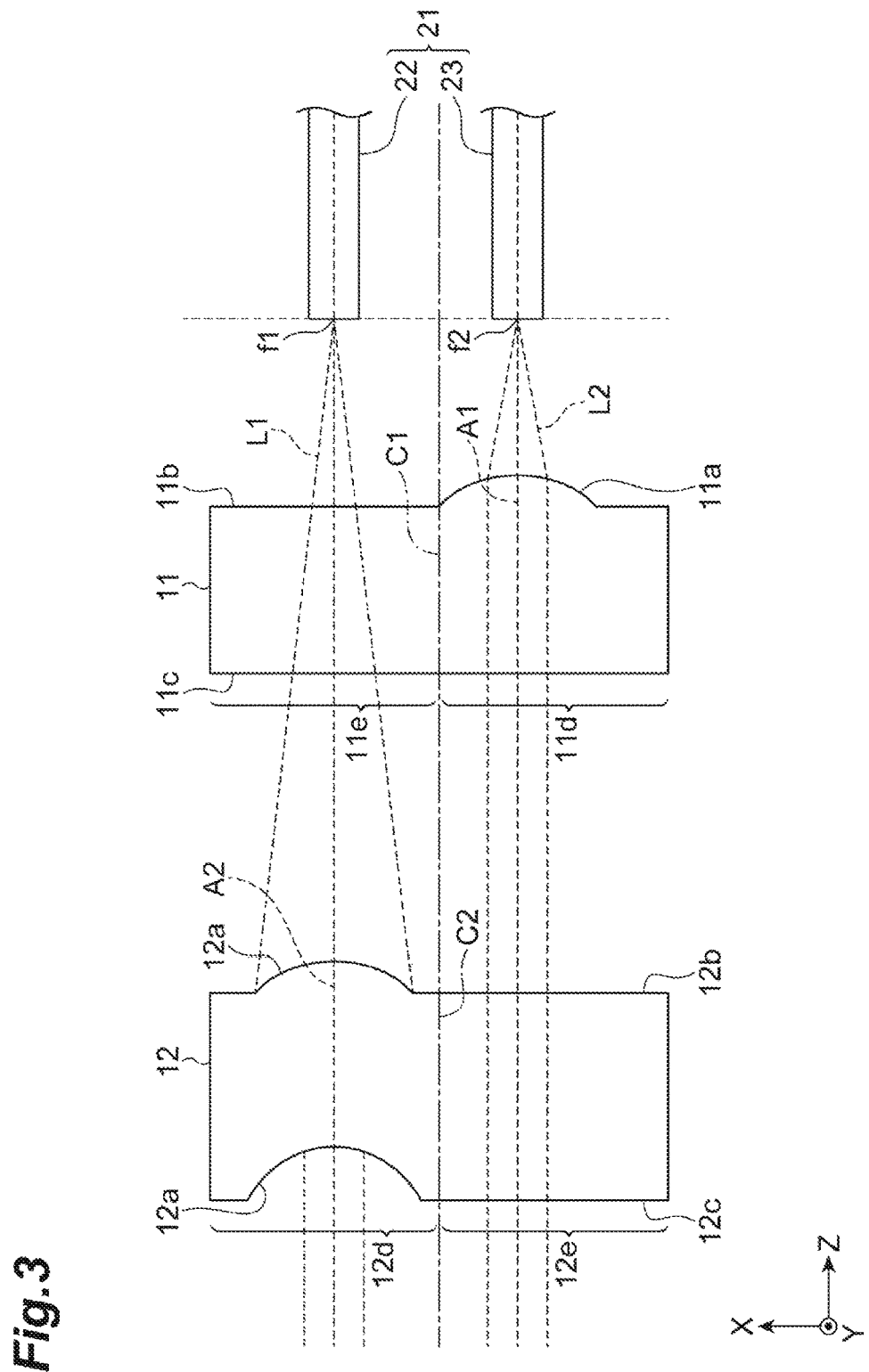
FIG. 3 is a diagram illustrating the configuration of a first optical element and a second optical element.

The configuration of the first optical element 11 and the second optical element 12 will be described in more detail. FIG. 3 is a diagram illustrating the configuration of the first optical element 11 and the second optical element 12. FIG. 3 shows a focal point f1 of the first lens 11a and a focal point f2 of the second lens 12a. The focal point f1 coincides with the position where the signal beam L1 is outputted from the SMF 22, and the focal point f2 coincides with the position where the local beam L2 is outputted from the PMF 23. As illustrated in FIG. 3, an optical axis A1 of the first lens 11a is located at a position misaligned from a center C1 of the first optical element 11. More specifically, the optical axis A1 is positioned in a lensed area 11d on one side in the X direction with respect to the center C1 of the first optical element 11 and is located on an extension line of the optical axis of the PMF 23. A plane area 11e on the other side of the first optical element 11 (that is, the opposite side to the optical axis A1 with respect to the center C1 of the first optical element 11) does not have a lens and is located on an extension line of the optical axis of the SMF 22.

An optical axis A2 of the second lens 12a is located at a position misaligned from a center C2 of the second optical element 12. More specifically, the optical axis A2 is positioned in a lensed area 12d on the other side in the X direction with respect to the center C2 of the second optical element 12 and is located on an extension line of the optical axis of the SMF 22. The plane area 11e of the first optical element 11 is located on an extension line of the optical axis A2. The lensed area 12d is at a position facing the plane area 11e of the first optical element 11 in the Z direction. A plane area 12e on one side of the second optical element 12 (that is, the opposite side to the optical axis A2 with respect to the center C2 of the second optical element 12) does not have a lens and is located on an extension line of the axis A1 of the first lens 11a. The plane area 12e is at a position facing the lensed area 11d of the first optical element 11 in the Z direction.

Here, the movement of the signal beam L1 outputted from the SMF 22 and the movement of the local beam L2 outputted from the PMF 23 will be described. The signal beam L1 outputted from the SMF 22 passes through the plane area 11e of the first optical element 11 while spreading, and then passes through the second lens 12a of the second optical element 12. At this time, the second lens 12a converts the signal beam L1 into collimated light. Thereafter, the signal beam L1 converted into the collimated light is inputted into the housing 2. On the other hand, the local beam L2 outputted from the PMF 23 passes through the first lens 11a. At this time, the first lens 11a converts the local beam L2 into collimated light. Thereafter, the local beam L2 passes through the plane area 12e of the second optical element 12 while keeping the state of collimated light, and is inputted into the housing 2.

As illustrated in FIGS. 1 and 2, the first lens holder 14 is positioned between the optical plug 20 and the bush 2b in the Z direction, and holds or stores the first optical element 11 therein. The first lens holder 14 has a cylindrical shape with the center axis of the ferrule 24 as its center axis. As illustrated in FIG. 2, the first lens holder 14 includes a rear end 14a and a front end 14b opposite to each other in the Z direction, a fat cylinder 14c located adjacent to the front end 14b side in the Z direction, and a narrow cylinder 14e excluding the fat cylinder 14c. The front end 14b faces the ferrule 24 in the Z direction. The outer diameter of the fat cylinder 14c is substantially equal to the outer diameter of the bush 2b. The outer diameter of the narrow cylinder 14e is smaller than the outer diameter of the fat cylinder 14c. The first optical element 11 is inserted into the narrow cylinder 14e. The inner diameter of the narrow cylinder 14e is equal to or slightly larger than the outer diameter of the first optical element 11.

Figure 4:
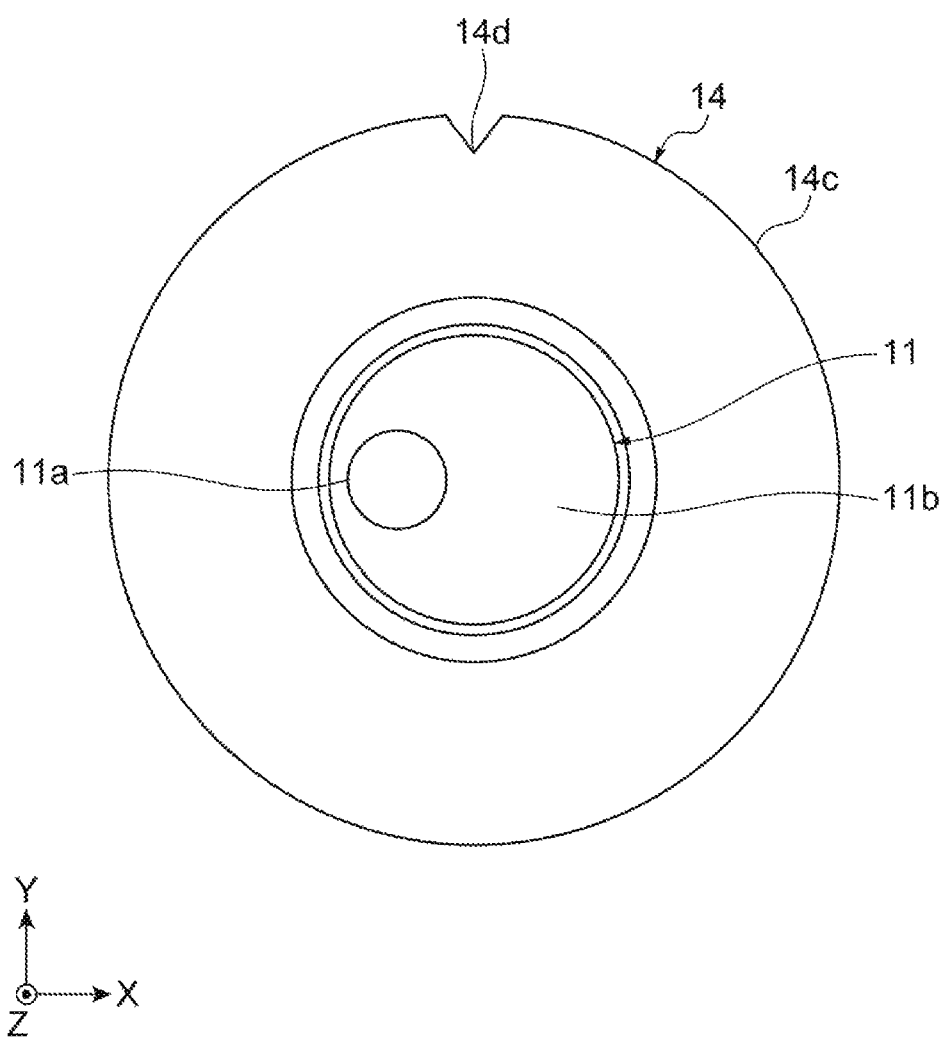
FIG. 4 is a front view illustrating a first lens holder.
Figure 5:
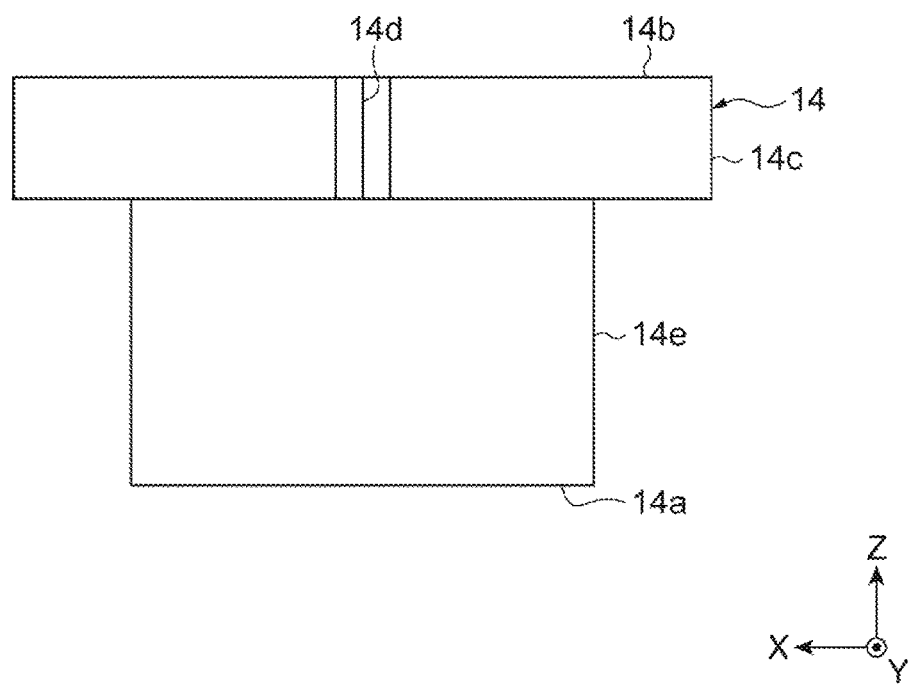
FIG. 5 is a side view illustrating the first lens holder.

FIG. 4 is a front view illustrating the first lens holder 14. FIG. 5 is a side view illustrating the first lens holder 14. FIG. 4 is a diagram of the first lens holder 14 illustrated in FIG. 1 as viewed from the Z direction, and FIG. 5 is a diagram of the first lens holder 14 illustrated in FIG. 1 as viewed from the Y direction. As illustrated in FIGS. 4 and 5, the fat cylinder 14c includes a V-cut 14d extending along the Z direction. The V-cut 14d is formed on the outer peripheral of the fat cylinder 14c and is provided at one end portion in the Y direction of the fat cylinder 14c. The relative angle about the center axis of the first optical element 11 with respect to the first lens holder 14 is defined with reference to the position of the V-cut 14d. Thus, the relative position of the first lens 11a with respect to the first lens holder 14 is defined.

As illustrated in FIGS. 1 and 2, the second lens holder 15 is positioned between the first lens holder 14 and the bush 2b in the Z direction, and holds or stores the second optical element 12 therein. The second lens holder 15 has a cylindrical shape with the center axis of the ferrule 24 as its center axis. As illustrated in FIG. 2, the second lens holder 15 includes an rear end 15a and a front end 15b opposite to each other in the Z direction, a fat cylinder 15c located adjacent to the front end 15b in the Z direction, and a narrow cylinder 15e excluding the fat cylinder 15c. The rear end 15a is joined to the bush 2b (see FIG. 1). The front end 15b faces the rear end 14a in the Z direction. The outer diameter of the fat cylinder 15c is substantially equal to the outer diameter of the fat cylinder 14c of the first lens holder 14. The outer diameter of the narrow cylinder 15e is smaller than the outer diameter of the fat cylinder 15c. The second optical element 12 is inserted into the fat cylinder 15c. The inner diameter of the fat cylinder 15c is equal to or slightly larger than the outer diameter of the second optical element 12.

Figure 6:
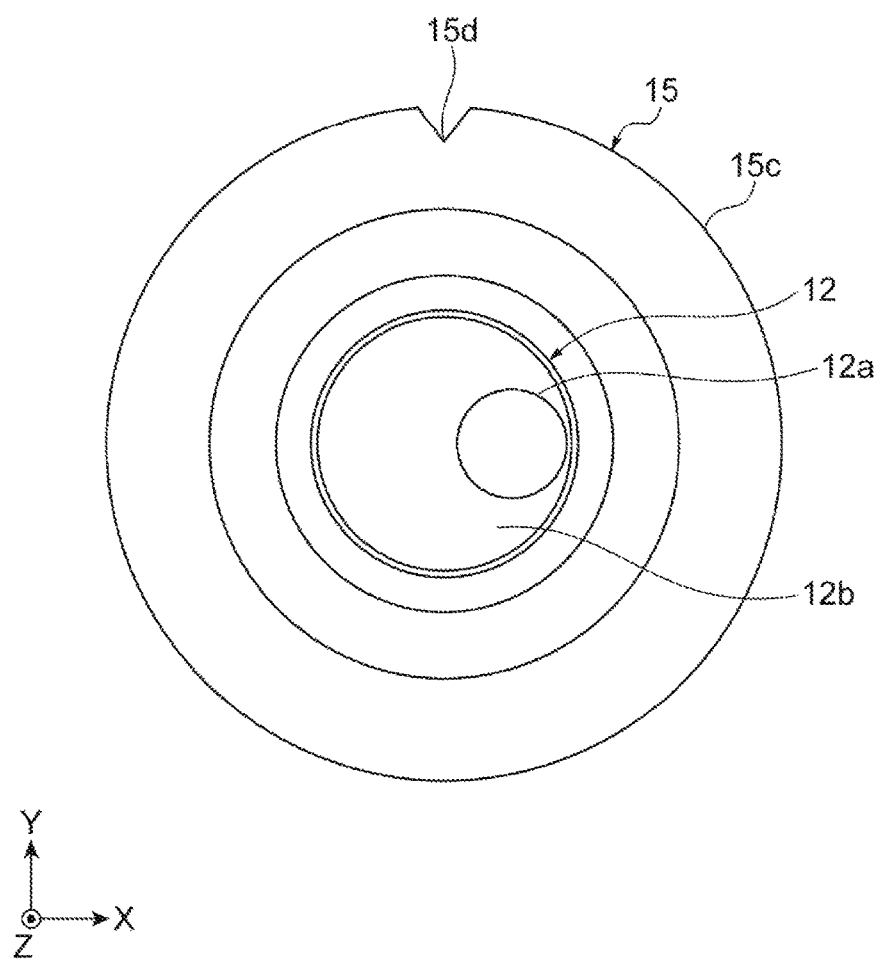
FIG. 6 is a front view illustrating a second lens holder.
Figure 7:
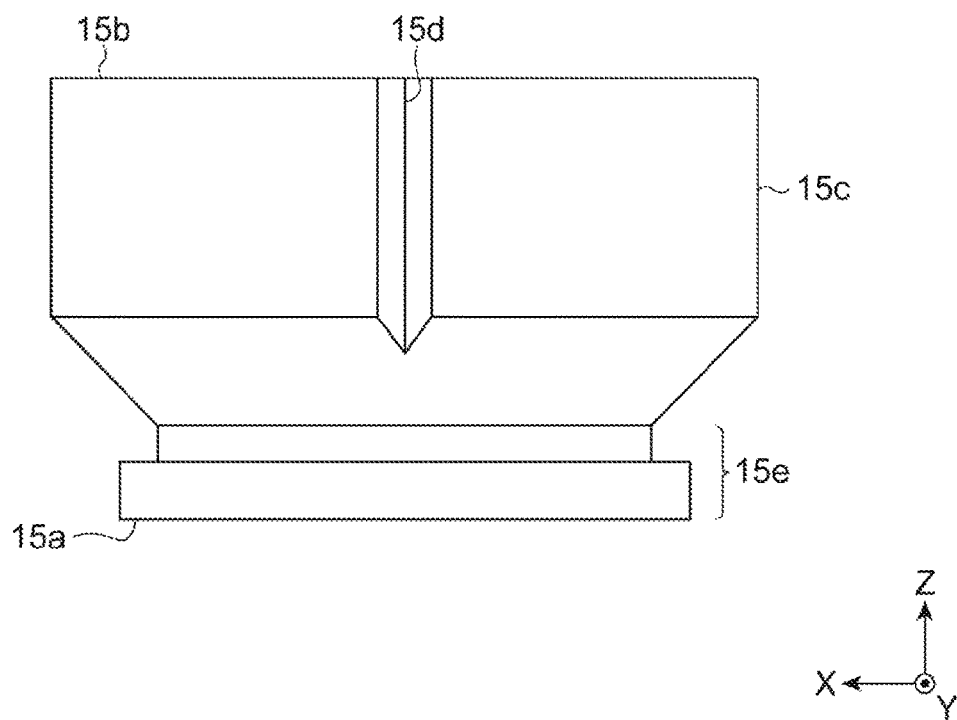
FIG. 7 is a side view illustrating the second lens holder.

FIG. 6 is a front view illustrating the second lens holder 15. FIG. 7 is a side view illustrating the second lens holder 15. FIG. 6 is a diagram of the second lens holder 15 illustrated in FIG. 1 as viewed from the Z direction, and FIG. 7 is a diagram of the second lens holder 15 illustrated in FIG. 1 as viewed from the Y direction. As illustrated in FIGS. 6 and 7, the fat cylinder 15c includes a V-cut 15d extending along the Z direction. The V-cut 15d is formed on the outer peripheral of the fat cylinder 15c and is provided at one end portion in the Y direction of the fat cylinder 15c. The relative angle about the center axis of the second optical element 12 with respect to the second lens holder 15 is defined with reference to the position of the V-cut 15d. Thus, the relative position of the second lens 12a with respect to the second lens holder 15 is defined.

Reference is made again to FIG. 1 and FIG. 2. Each of the coupling sleeve 16 and the aligning sleeve 17 has a cylindrical shape with the center axis of the ferrule 24 as its center axis. One end of the coupling sleeve 16 in the Z direction is joined to the front end 15b of the second lens holder 15. Other end of the coupling sleeve 16 faces the fat cylinder 14c of the first lens holder 14 in the Z direction. The narrow cylinder 14e of the first lens holder 14 is inserted into the coupling sleeve 16. The inner diameter of the coupling sleeve 16 is equal to or slightly larger than the outer diameter of the narrow cylinder 14e. The outer diameter of the coupling sleeve 16 is smaller than the outer diameter of the fat cylinder 15c. The distance between the first lens holder 14 and the second lens holder 15 in the Z direction is defined by fixing the coupling sleeve 16 and the narrow cylinder 14e to each other by welding, for example, at a predetermined position in the Z direction. Thus, the distance between the first optical element 11 and the second optical element 12 in the Z direction is defined.

One end of the aligning sleeve 17 in the Z direction is joined to the front end 14b of the first lens holder 14. The ferrule 24 is inserted into the aligning sleeve 17. The inner diameter of the aligning sleeve 17 is equal to or slightly larger than the outer diameter of the ferrule 24. The outer diameter of the aligning sleeve 17 is smaller than the outer diameter of the fat cylinder 14c of the first lens holder 14 and the outer diameter of the fat cylinder 15c of the second lens holder 15. The aligning sleeve 17 holds the fiber unit 21 with the ferrule 24 and the capillary 25. The distance between the first lens holder 14 and the ferrule 24 in the Z direction is defined by fixing the aligning sleeve 17 and the ferrule 24 to each other by welding, for example, at a predetermined position in the Z direction. Consequently, the distance between the first optical element 11 and the fiber unit 21 in the Z direction is defined.

Figure 8:
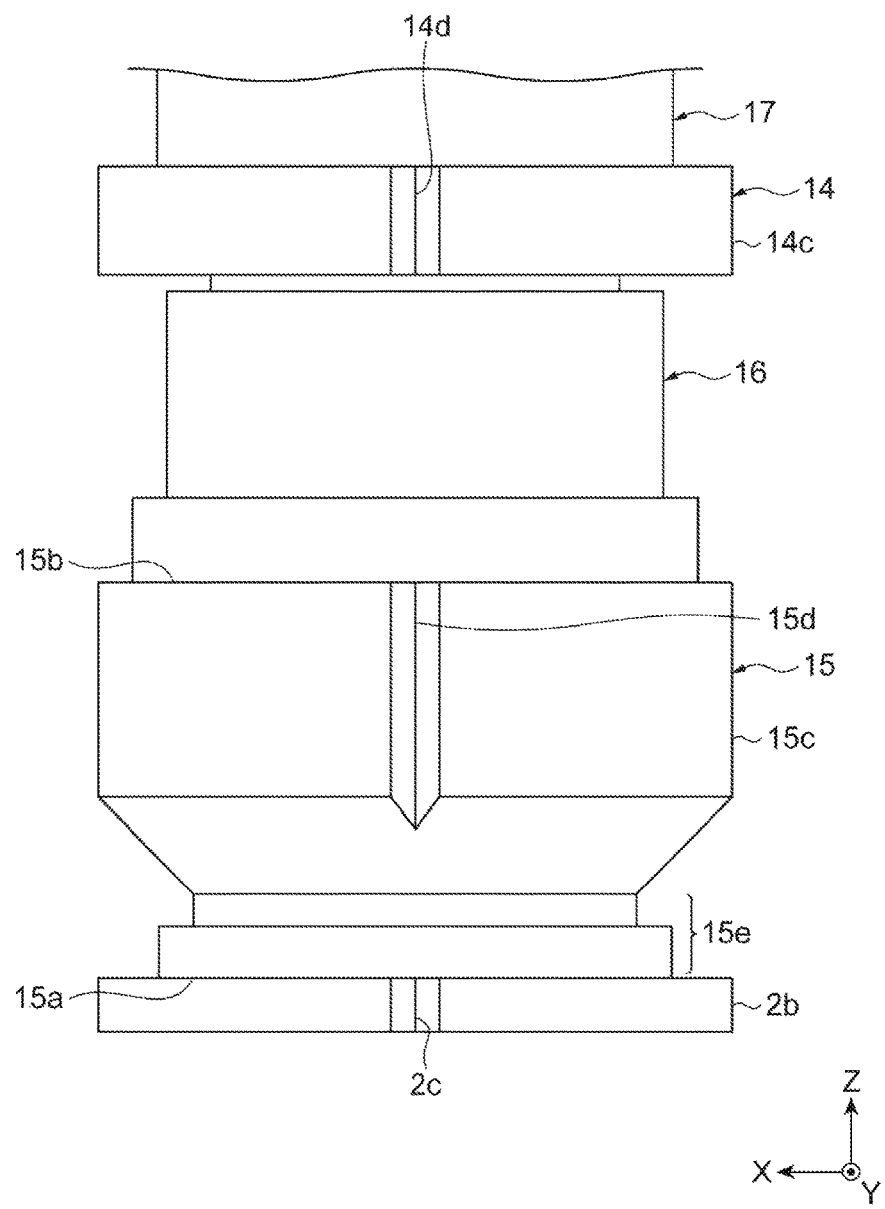
FIG. 8 is a side view illustrating a state in which the first lens holder, the second lens holder, a coupling sleeve and an aligning sleeve are assembled, and the second lens holder is joined to one end surface.

FIG. 8 is a side view illustrating a state in which the first lens holder 14, the second lens holder 15, the coupling sleeve 16 and the aligning sleeve 17 are assembled, and the rear end 15a of the second lens holder 15 is joined to the bush 2b. FIG. 8 is a side view as viewed from the Y direction. As illustrated in FIG. 8, the V-cut 14d and the V-cut 15d are located at the same position as the V-cut 2c formed on the outer peripheral surface of the bush 2b when seen from the Z direction. In other words, the V-cut 14d, the V-cut 15d and the V-cut 2c are located on a line parallel to the Z direction. The shape of the V-cut 14d and the shape of the V-cut 15d coincide with the shape of the V-cut 2c in the circumferential direction. By arranging the position of the V-cut 14d in the circumferential direction of the first lens holder 14 to be coincident with the position of the V-cut 2c in the circumferential direction of the bush 2b, the relative angle about the center axis of the first lens holder 14 with respect to the bush 2b is defined. Thus, the relative position of the first lens 11a with respect to the bush 2b is defined. Further, by arranging the position of the V-cut 15d in the circumferential direction of the second lens holder 15 to be coincident with the position of the V-cut 2c in the circumferential direction of the bush 2b, the relative angle about the center axis of the second lens holder 15 with respect to the bush 2b is defined. Thus, the relative position of the second lens 12a with respect to the bush 2b is defined.

Reference is made again to FIG. 1. In addition to the configuration described above, the optical receiver module 1 of the present embodiment stores in the housing 2 optical hybrids 30 and 31 that cause the signal beam L1 and the local beam L2 to interfere with each other. The optical hybrids 30 and 31 can be, for example, optical 90° hybrid elements. The optical hybrids 30 and 31 are placed side by side along the X direction in the housing 2. The optical receiver module 1 stores in the housing 2: a polarization beam splitter (PBS) 32; a skew adjustor 33; two lenses 34 and 35; a half wavelength ($\lambda/2$) plate 36; and a mirror 37 as the first optical component for optically coupling the SMF 22 to the each signal beam input point of the optical hybrids 30, 31.

The PBS 32 is positioned on the optical path of the signal beam L1 outputted from the SMF 22. The PBS 32 has a light incident surface optically coupled to the SMF 22, and splits the signal beam L1 into one polarization component (for example, an X-polarization component, which is a component included in the X-Z plane) L11 and other polarization component (for example, a Y-polarization component, which is a component included in the Y-Z plane) L12. At this time, the splitting ratio is, for example, 50%. The one polarization component L11 travels straight through the PBS 32 toward the signal beam input point of the optical hybrid 30. The traveling direction of the other polarization component L12 is changed by 90° by the PBS 32, and the other polarization component L12 travels toward the mirror 37.

The skew adjustor 33 and the lens 34 are positioned on the optical path between the PBS 32 and the signal beam input point of the optical hybrid 30 (that is, on an extension line of the optical axis of the signal beam input point of the optical hybrid 30). The one polarization component L11 which has been transmitted through the PBS 32 passes through the skew adjustor 33. The skew adjustor 33 is, for example, a block member made of Si and equivalently lengthens the optical path length of the one polarization component L11 to compensate for a phase delay of the other polarization component L12 with respect to the one polarization component L11 caused by the difference between their optical path lengths. After passing through the skew adjustor 33, the one polarization component L11 is condensed by the lens 34 to the signal beam input point of the optical hybrid 30. The travelling direction of the other polarization component L12 split by the PBS 32 is changed again by 90° by the mirror 37, and then the other polarization component L12 travels toward the signal beam input point of the optical hybrid 31.

The half-wavelength plate 36 and the lens 35 are positioned on the optical path between the mirror 37 and the signal beam input point of the optical hybrid 31. The other polarization component L12 reflected by the mirror 37 passes through the half-wavelength plate 36. The half-wavelength plate 36 rotates the polarization direction of the other polarization component L12 by 90°. Therefore, the polarization direction of the other polarization component L12 which has passed through the half-wavelength plate 36 coincides with the polarization direction of the one polarization component L11 which has traveled straight through the PBS 32. The other polarization component L12 passes through the PBS 32 and is then condensed by the lens 35 to the signal beam input point of the optical hybrid 31.

The optical receiver module 1 further stores in the housing 2 the skew adjustor 33, the mirror 37, a polarizer 38, a beam splitter (BS) 39, and two lenses 40 and 41 as the second optical component for optically coupling the PMF 23 to the each local beam input point of the optical hybrids 30, 31. The polarizer 38 is optically coupled to the PMF 23 and positioned on the optical path of the local beam L2 outputted from the PMF 23. The polarizer 38 adjusts the polarization direction of the local beam L2. Therefore, even if the polarization direction maintained in the PMF 23 deviates when assembling the housing 2, only the polarization component with the polarization direction of 0° or 90° can be extracted as the local beam L2. When the light source of the local beam L2 is a semiconductor LD, the local beam L2 is usually elliptically polarized light in which a polarization component parallel to the active layer is dominant. However, there is a case where distortion due to lattice mismatch is introduced in the active layer to obtain oscillation stability of the semiconductor LD, material reliability, desired output wavelength, etc. A laser beam outputted from such a semiconductor LD may be elliptically polarized light with a relatively long minor-axis length. Even in such a case, the polarizer 38 converts the local beam L2 from elliptically polarized light to linearly polarized light having a desired polarization direction (for example, a direction included in the X-Z plane).

The BS 39 splits the local beam L2 outputted from the polarizer 38 into two. The splitting ratio is 50:50. One of the split local beam, L21, travels straight through the BS 39 toward the local beam input point of the optical hybrid 30. The traveling direction of other local beam L22 is changed by 90° by the BS 39, and then the other local beam L22 travels toward the mirror 37. The skew adjustor 33 and the lens 40 are positioned on the optical path between the BS 39 and the local beam input point of the optical hybrid 30 (that is, on an extension line of the optical axis of the local beam input point of the optical hybrid 30). The local beam L21 traveled straight through the BS 39 passes through the skew adjustor 33. The skew adjustor 33 equivalently lengthens the optical path length of the local beam L21 to compensate for a phase delay of the local beam L22 with respect to the local beam L21 caused by the difference between the respective optical path lengths. After passing through the skew adjustor 33, the local beam L21 is condensed by the lens 40 to the local beam input point of the optical hybrid 30.

The traveling direction of the other local beam L22 is changed again by 90° by the mirror 37, and then the other local beam L22 travels toward the local beam input point of the optical hybrid 31. The optical axis of the other local beam L22 reflected by the mirror 37 is positioned on an extension line of the optical axis of the local beam input point of the optical hybrid 31. The lens 41 is positioned on the optical path between the mirror 37 and the local beam input point of the optical hybrid 31 (that is, on an extension line of the optical axis of the local beam input point of the Optical hybrid 31). The other local beam L22 reflected by the mirror 37 is condensed by the lens 41 to the local beam input point of the optical hybrid 31.

As described above, the signal beam L1 and the local beam L2 inputted into the housing 2 are distributed to the two optical hybrids 30 and 31. The optical hybrids 30 and 31 are of photodiode (PD) integrated type using a semiconductor substrate made of, for example, indium phosphide (InP).

The optical hybrids 30 and 31 cause the signal beams L11, L12 and the local beams L21, L22, which are optically coupled to the respective input points, to interfere with each other, and thereby extract a signal component of the signal beam L1 having the same phase as that of the local beam L2 and a signal component with a phase different by 90° from that of the local beam L2. Each of pre-amplifiers 43 mounted in the housing 2A converts photocurrent generated by the PD integrated in each of the optical hybrids 30, 31 into a voltage signal by, and outputs from any one of a plurality of lead terminals 3.

Figure 9:
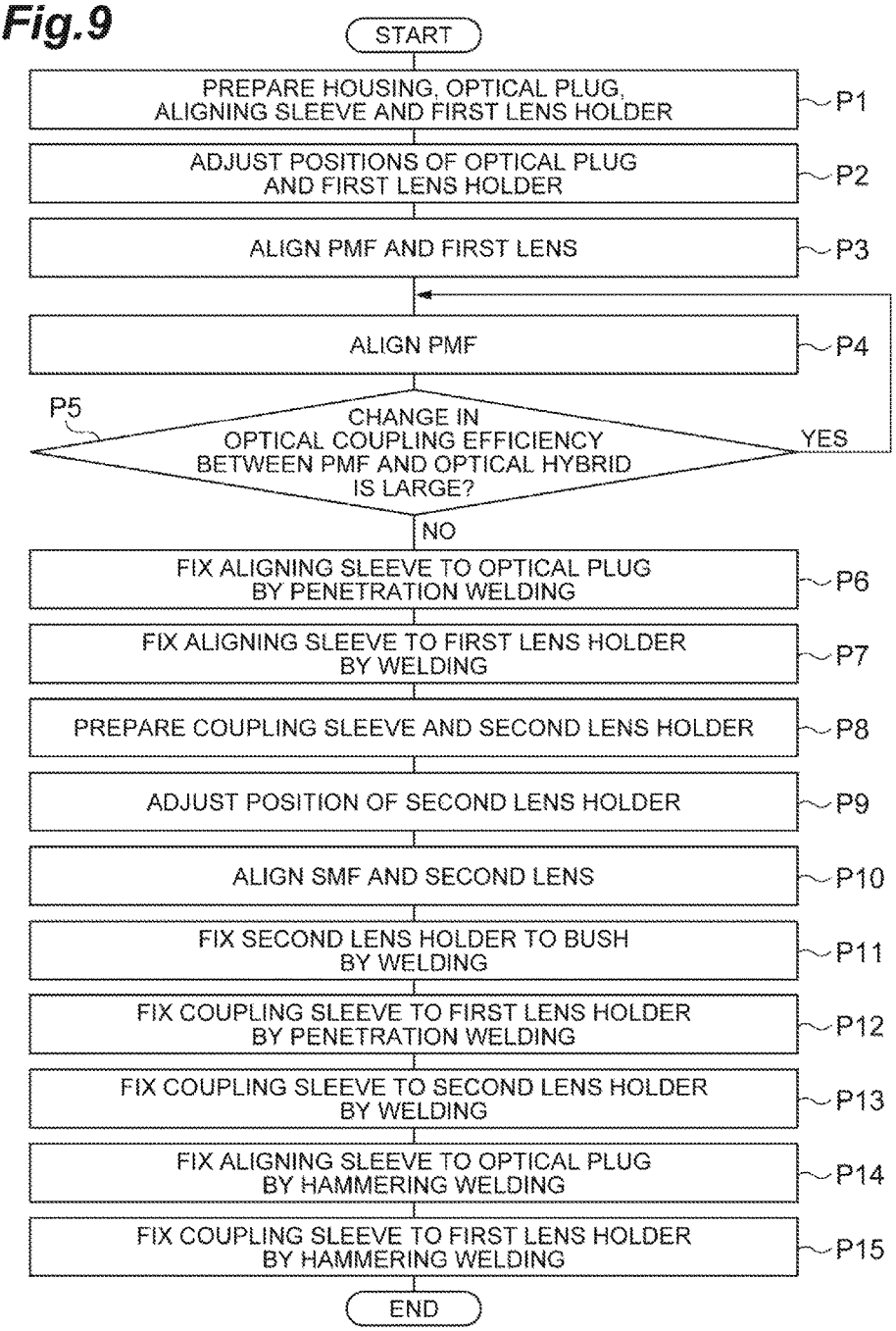
FIG. 9 is an example of a flowchart illustrating a method for manufacturing a coherent optical receiver module.
Figure 10:
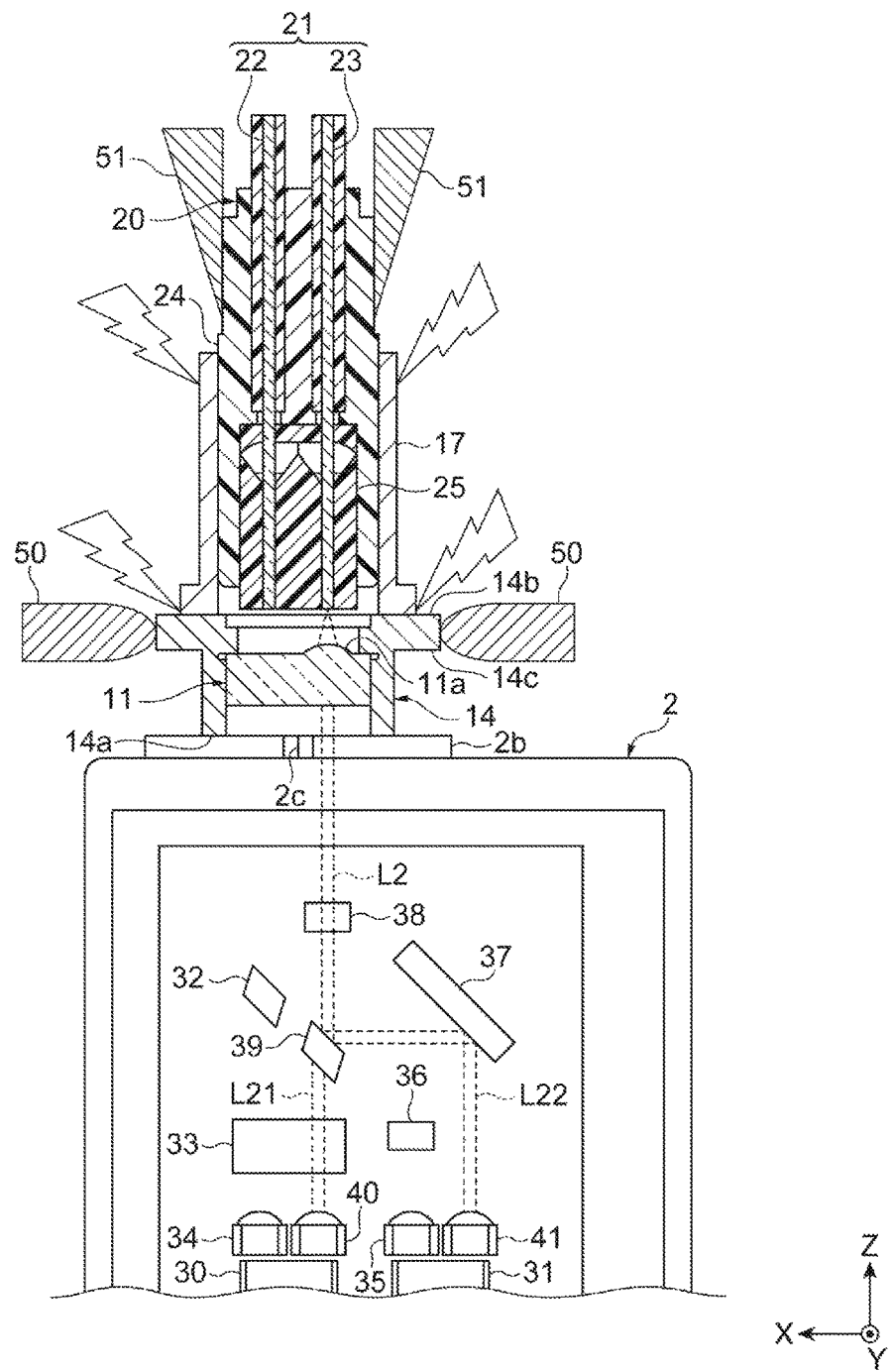
FIG. 10 is a diagram illustrating a manufacturing process of the coherent optical receiver module.
Figure 11:
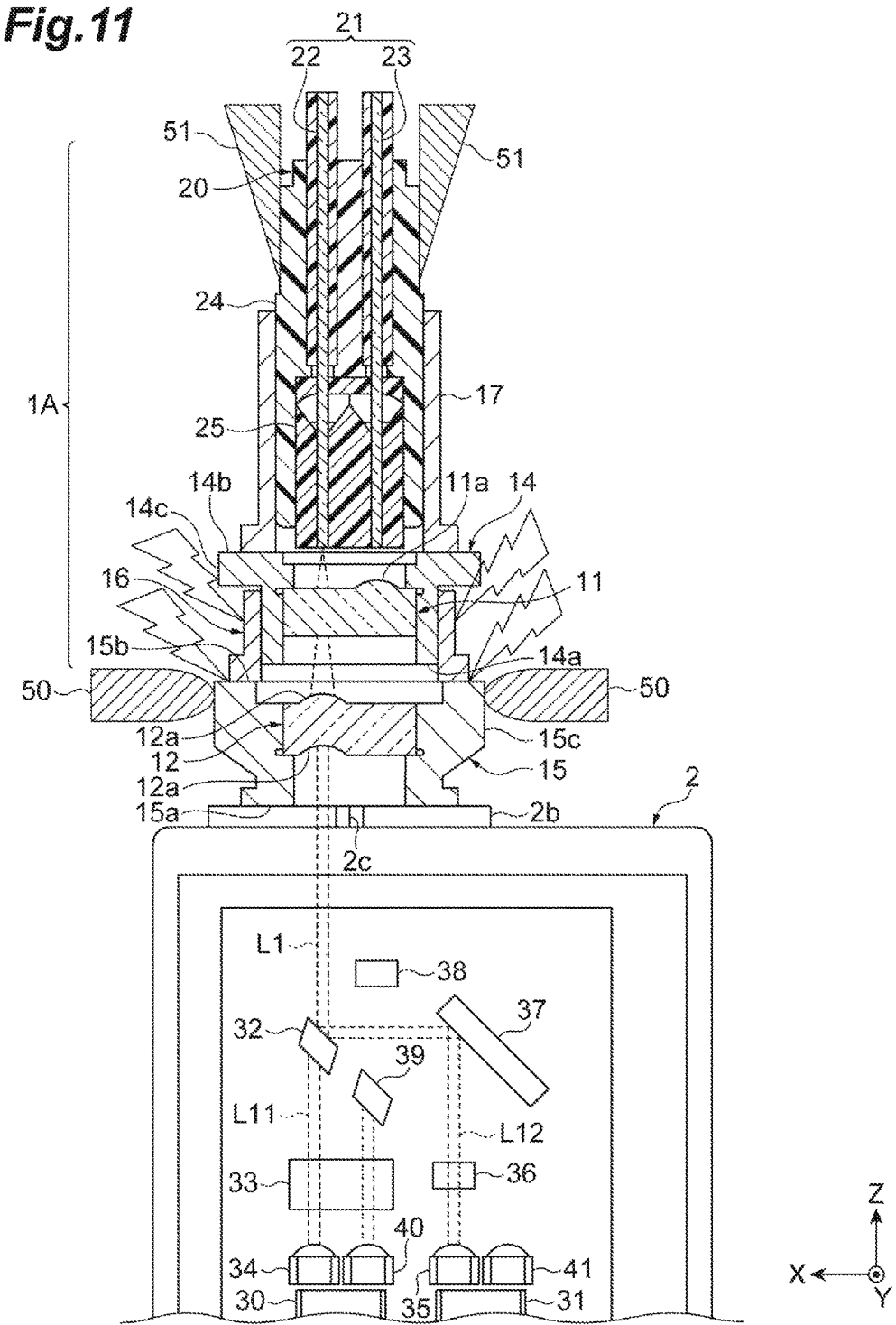
FIG. 11 is a diagram illustrating a manufacturing process of the coherent optical receiver module.
Figure 12:
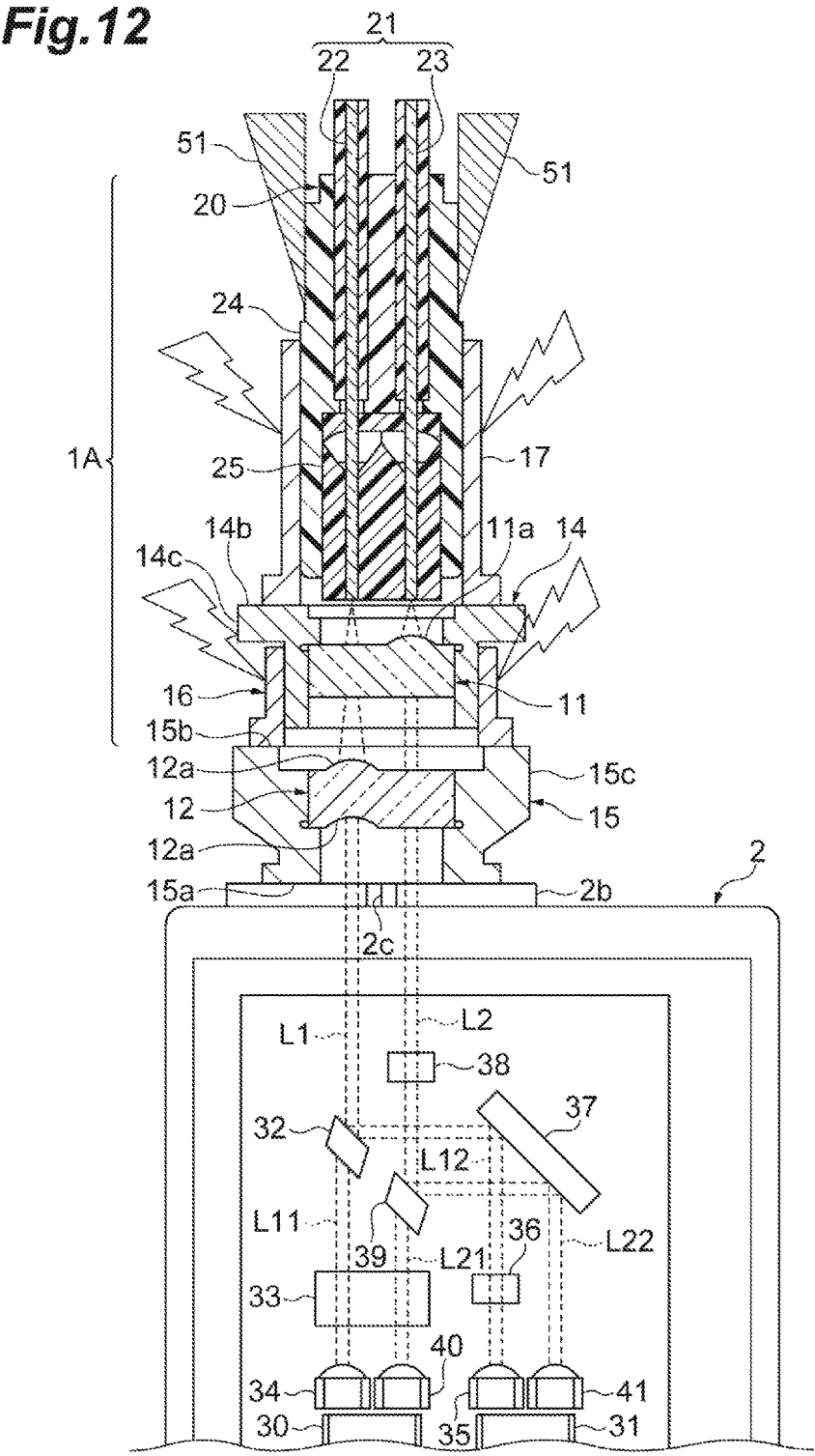
FIG. 12 is a diagram illustrating a manufacturing process of the coherent optical receiver module.

A method for manufacturing the optical receiver module 1 having the above configuration will be described with reference to FIGS. 9 to 12. FIG. 9 is an example of a flowchart illustrating the method for manufacturing the optical receiver module 1. Each of FIGS. 10, 11 and 12 is a diagram illustrating a manufacturing process of the optical receiver module 1. As illustrated in FIG. 10, after mounting various optical components in the housing 2, the housing 2, the optical plug 20, the aligning sleeve 17, the first lens holder 14 holding the first optical element 11, and assembling tools 50, 51 are prepared (step P1).

Next, the positions of the first lens holder 14 and the optical plug 20 are respectively adjusted using the assembling tools 50 and 51 (step P2). Step P2 includes the following steps. First, the first lens holder 14 is positioned between the bush 2b and the optical plug 20. In other words, the first optical element 11 is positioned between the bush 2b and the fiber unit 21. Next, the position of the first lens holder 14 is adjusted while gripping the fat cylinder 14c of the first lens holder 14 with the assembling tool 50. At this time, the position of the V-cut 14d in the circumferential direction of the first lens holder 14 is made coincident with the position of the V-cut 2c in the circumferential direction of the bush 2b when seen from the Z direction (see FIG. 8). Thereafter, the rear end 14a of the first lens holder 14 is pressed against the bush 2b. Next, while gripping the ferrule 24 with the assembling tool 51, the optical plug 20 is positioned to face the first lens holder 14 in the Z direction. Then, the optical plug 20 is inserted into the aligning sleeve 17, and the position of the optical plug 20 is adjusted.

Next, the XYZ alignment of the PMF 23 and the XY alignment of the first lens 11a are simultaneously performed (step P3). In step P3, the local beam L2 is introduced into the housing 2 from the PMF 23, and the intensity of the local beam L2 is detected by the built-in PDs of the optical hybrids 30 and 31. At this time, the positions of the PMF 23 and the first lens 11a are determined with reference to the intensity of the local beam L2 detected by the built-in PDs. Subsequently, while rotating the optical plug 20 with the assembling tool 51, the XY alignment of the PMF 23 is performed (step P4). At this time, the rotation angle about the center axis of the PMF 23 is set at a predetermined angle so that the slow axis of the local beam L2 coincides with the polarization direction of the polarizer 38. Then, the position of the PMF 23 is adjusted to maximize the optical coupling efficiency of the local beam L2 with respect to the local beam input points of the optical hybrids 30 and 31.

Subsequently, wavelength sweeping is performed on the local beam L2 outputted from the PMF 23, thereby evaluating the change in the optical coupling efficiency between the PMF 23 and the optical hybrids 30, 31 (step P5). As a result, if the change in the optical coupling efficiency is large, the step P4 is repeated again and the PMF 23 is aligned to decrease the change in the optical coupling efficiency. If the change in the optical coupling efficiency is small, the optical plug 20 and the aligning sleeve 17 are fixed to each other by penetration welding (step P6). Thereafter, the XY alignment of the PMF 23 is performed again, and then the first lens holder 14 and the aligning sleeve 17 are fixed to each other by welding (step P7). Consequently, the first optical element 11 and the fiber unit 21 are fixed to each other.

Subsequently, as illustrated in FIG. 11, the coupling sleeve 16 and the second lens holder 15 holding the second optical element 12 are prepared (step P8). Next, an intermediate assembly 1A consisting of the optical plug 20, the aligning sleeve 17 and the first lens holder 14 is separated from the assembling tool 50 and lifted in the Z direction by the assembling tool 51. Next, the position of the second lens holder 15 is adjusted with the assembling tool 50 (step P9). In step 9, first, the second lens holder 15 is positioned between the first lens holder 14 and the bush 2b. In other words, the second optical element 12 is positioned between the first optical element 11 and the bush 2b. Next, the fat cylinder 15c of the second lens holder 15 is gripped with the assembling tool 50, and the position of the second lens holder 15 is adjusted using the assembling tool 50. At this time, the position of the V-cut 15d in the circumferential direction of the second lens holder 15 is made coincident with the position of the V-cut 2c in the circumferential direction of the bush 2b when seen from the Z direction (see FIG. 8). Thereafter, the rear end 15a of the second lens holder 15 is pressed against the bush 2b.

Subsequently, the first lens holder 14 is inserted into the coupling sleeve 16, and the coupling sleeve 16 is brought into contact with the front end 15b of the second lens holder 15. Next, the XYZ alignment of the intermediate assembly 1A and the XY alignment of the second lens 12a are simultaneously performed (step P10). In step P10, the signal beam L1 is introduced into the housing 2 from the SMF 22, and the intensity of the signal beam L1 is detected by the built-in PD of each of the optical hybrids 30, 31. Then, with reference to the intensity of the signal beam L1 detected by the built-in PDs, the position of each of the SMF 22 and the second optical element 12 is determined. Next, the second lens holder 15 and the bush 2b are fixed to each other by welding (step P11). Consequently, the second optical element 12, the first optical element 11 and the bush 2b are fixed to each other. Next, the coupling sleeve 16 and the first lens holder 14 are fixed to each other by penetration welding (step P12). Thereafter, the XY alignment of the intermediate assembly 1A is performed with the assembling tool 51, and the coupling sleeve 16 and the second lens holder 15 are fixed to each other by welding (step P13).

Next, the positions of the optical plug 20 and the first lens holder 14 are finely adjusted while introducing the signal beam L1 and the local beam L2 again into the housing 2. First, as illustrated in FIG. 12, the local beam L2 is introduced again from the PMF 23 into the housing 2, and, with reference to the intensity of the local beam L2 detected by the built-in PDs of the optical hybrids 30 and 31, the aligning sleeve 17 and the optical plug 20 are fixed to each other by hammering welding (step P14). Next, the signal beam L1 is introduced again from the SMF 22 into the housing 2, and, with reference to the intensity of the signal beam L1 detected by the built-in PDs of the optical hybrids 30 and 31, the coupling sleeve 16 and the first lens holder 14 are fixed to each other by hammering welding (step P15).

Effects obtained by the optical receiver module 1 and the method for manufacturing the same according to the present embodiment described above will be described together with the problems of conventional techniques. As optical transceivers adopting a digital coherent optical transmission technology, optical transceivers compliant with CFP (Centum Form-factor Pluggable) standards are popular. In recent years, smaller CFP2 optical transceivers are in high demand. In the future, a shift from CFP2 optical transceivers to further smaller CFP4 optical transceivers is expected. Along with this shift, miniaturization is advancing for equipment, such as a modulator, a wavelength tunable light source and an optical receiver module to be mounted in such an optical transceiver. In the optical receiver module, by causing a local beam to interfere with a phase-modulated signal beam, information included in the signal beam is restored, and, for example, a signal port for inputting the signal beam and a local port for inputting the local beam are required. The signal port and the local port are respectively connected to SMF and PMF (hereinafter collectively referred to as the "optical fiber").

As a technique of miniaturizing such an optical receiver module, a structure in which the optical fiber is drawn into the housing can be considered. For example, if the optical hybrid is formed of a silica-based planar waveguide, a technique of integrally coupling the optical hybrid to the optical fiber by a butt-joint method can be considered. In the case where the optical hybrid is made of a semiconductor such as silicon or InP, since there is a large difference in MFD (Mode Field Diameter) between the optical hybrid and the optical fiber, a technique adopting the but-joint method and using, for example, a spot size converter can be considered. In this case, it is more general to apply a technique of optically coupling the optical hybrid to the optical fiber using a grating coupler.

However, if the optical fiber is drawn into the housing in this manner, the productivity of the optical receiver module is decreased, and special processing is required for the optical fiber, which may increase the cost. It is therefore desirable to miniaturize the optical receiver module by not adopting the structure in which the optical fiber is drawn into the housing. Then, as a structure that does not draw the optical fiber into the housing, for example, a structure in which one optical coupling system is formed by an optical fiber array and a lens array on the outside of the housing can be considered. However, the interval between the optical axes of the lenses of the lens array and the interval between the cores of the optical fiber array easily misalign from each other due to, for example, manufacturing variability. Consequently, the coupling efficiency between the optical fiber array and the optical hybrid inside the housing may be decreased. An optical receiver module having this structure will be described below as a comparative example.

Figure 13:
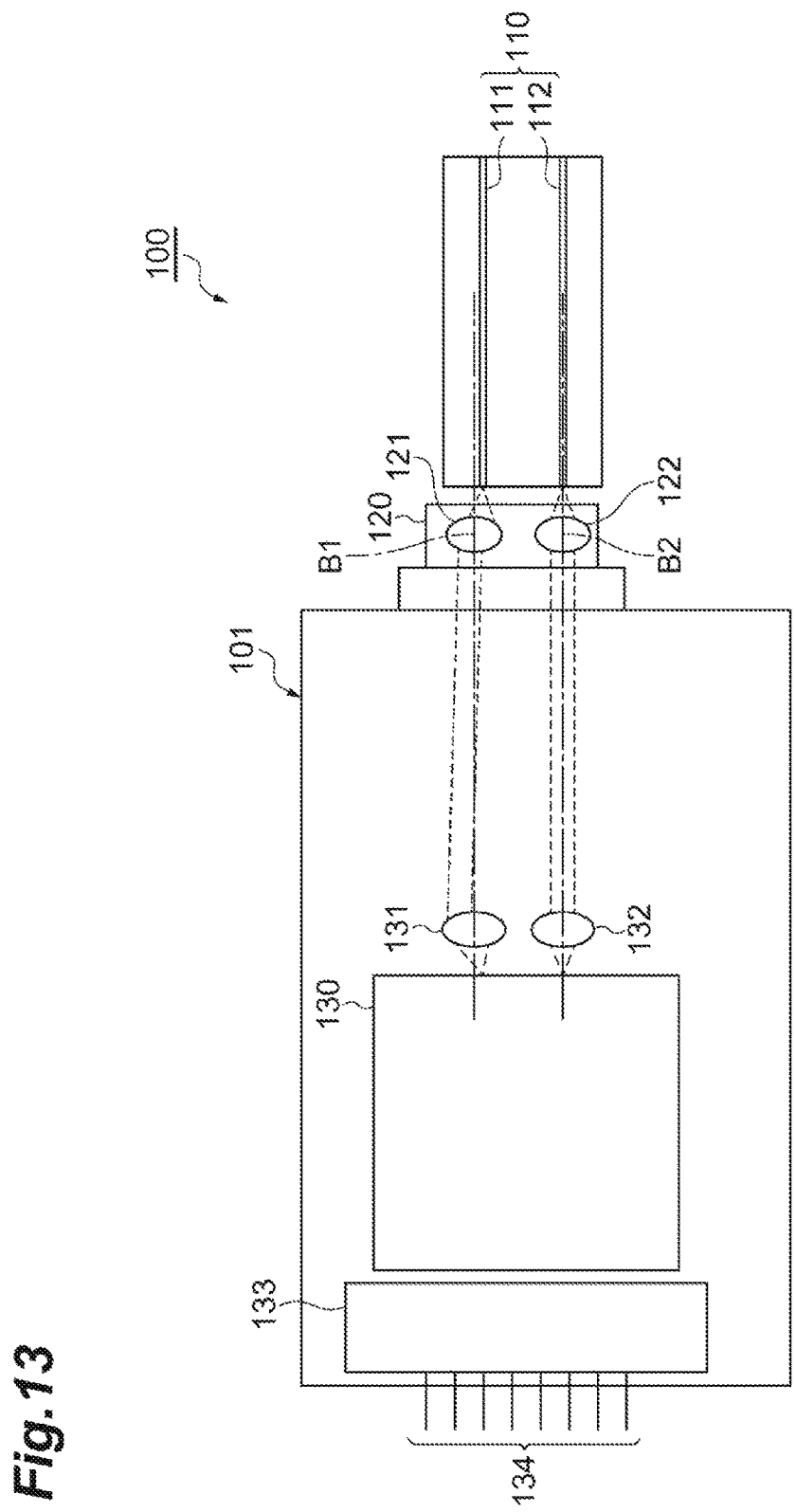
FIG. 13 is a schematic diagram illustrating the configuration of a coherent optical receiver module as a comparative example.

FIG. 13 is a schematic diagram illustrating the configuration of an optical receiver module 100 as a comparative example. The optical receiver module 100 includes a housing 101, a fiber unit 110, and an arrayed lens 120. The fiber unit 110 is positioned outside the housing 101. The fiber unit 110 has an SMF 111 for inputting the signal beam L1 and a PMF 112 for inputting the local beam L2. The SMF 111 and the PMF 112 input the signal beam L1 and the local beam L2 into the housing 101, respectively. The arrayed lens 120 is positioned between the housing 101 and the fiber unit 110. The arrayed lens 120 has lenses 121 and 122 arranged to face the SMF 111 and the PMF 112, respectively. An optical axis B1 of the lens 121 is located at a position deviated from an extension line of the optical axis of the SMF 111, and an optical axis B2 of the lens 122 is positioned on an extension line of the optical axis of the PMF 112. In other words, the interval between the optical axes of the arrayed lens 120 and the interval between the cores of the fiber unit 110 are different from each other. The lens 121 converts the signal beam L1 outputted from the SMF 111 into collimated light. The lens 122 converts the local beam L2 outputted from the PMF 112 into collimated light.

An optical hybrid 130, lenses 131, 132, and a preamplifier 133 are positioned in the housing 101. The lens 131 is positioned between the signal beam input point of the optical hybrid 130 and the lens 121. The lens 132 is positioned between the local beam input point of the optical hybrid 130 and the lens 122. The pre-amplifier 133 converts a photocurrent generated by a PD integrated in the optical hybrid 130 into a voltage signal. Then, the voltage signal is outputted from any one of a plurality of lead terminals 134 mounted in the housing 101.

In the optical receiver module 100 having the above configuration, the local beam L2 outputted from the PMF 112 travels straight through the lens 122 and is then condensed by the lens 132 to the local beam input point of the optical hybrid 130. On the other hand, when the signal beam L1 outputted from the SMF 111 enters the lens 121, the signal beam L1 is bent inside the lens 121 with respect to the optical axis B1 of the lens 121. Thereafter, the signal beam L1 is outputted from the lens 121, and enters the lens 131 in an inclined state with respect to the optical axis of the lens 131. Thus, if the signal beam L1 enters the lens 131 in an inclined state with respect to the optical axis of the lens 131, the position where the signal beam L1 is condensed by the lens 131 is deviated from the position of the signal beam input point of the optical hybrid 130. As a result, there arises a problem that the coupling efficiency between the SMF 111 and the optical hybrid 130 is decreased.

In contrast, in the optical receiver module 1 of the present embodiment, as illustrated in FIG. 2, the first optical element 11 having the first lens 11a positioned on the optical path of the local beam L2 and the second optical element 12 having the second lens 12a positioned on the optical path of the signal beam L1 are placed side by side along the Z direction, the first optical element 11 transmits the signal beam L1 and the local beam L2, and the second optical element 12 transmits the signal beam L1 and the local beam L2. Therefore, it is possible to narrow the interval between the optical axis A1 of the first lens 11a and the optical axis A2 of the second lens 12a (see FIG. 3), and it is possible to constitute one optical coupling system including the first lens 11a and the second lens 12a for the fiber unit 21. In other words, the first lens 11a and the second lens 12a can be stored in a single coupling portion 10. As a result, the size of the optical receiver module 1 can be reduced. Further, the first lens 11a and the second lens 12a are separately provided in the first optical element 11 and the second optical element 12, respectively. In other words, the first lens 11a and the second lens 12a are not integrated into a single unit. Thus, the first lens 11a and the second lens 12a can be aligned individually in manufacturing the optical receiver module 1. As a result, decrease in the optical coupling efficiency between the PMF 23 and the first optical component and decrease in the optical coupling efficiency between the SMF 22 and the second optical component can be reduced.

The optical axis A1 of the first lens 11a and the optical axis A2 of the second lens 12a are located at positions misaligned from the center C1 of the first optical element 11 and the center C2 of the second optical element 12, respectively. The plane area 11e of the first optical element 11 does not have a lens and is located on an extension line of the optical axis A2 of the second lens 12a, and the plane area 12e of the second optical element 12 does not have a lens and is located on an extension line of the optical axis A1 of the first lens 11a (see FIG. 3). Therefore, the alignment of the first lens 11a can be performed without being influenced by the location of the second optical element 12, and the alignment of the second lens 12a can be performed without being influenced by the location of the first optical element 11. Consequently, decrease in the optical coupling efficiency between the PMF 23 and the first optical component and decrease in the optical coupling efficiency between the SMF 22 and the second optical component can be reduced.

The first optical element 11 is positioned between the fiber unit 21 and the second optical element 12. The method for manufacturing the optical receiver module 1 comprises: steps P2 and P3 of positioning the first optical element 11 between the one end surface 2a and the fiber unit 21 and aligning the first lens 11a of the first optical element 11; step P7 of fixing the first optical element 11 and the fiber unit 21 to each other, steps P9 and P10 of positioning the second optical element 12 between the one end surface 2a and the first optical element 11 and aligning the second lens 12a of the second optical element 12; and step P11 of fixing the second optical element 12, the first optical element 11 and the one end surface 2a to each other. When manufacturing the optical receiver module 1, it is desirable to align the second lens 12a after aligning the first lens 11a and fixing the position of the first optical element 11. The reason is as follows. In aligning the first lens 11a, it is necessary to rotate the fiber unit 21 about the center axis in order to adjust the polarization direction of the local beam L2. If the second lens 12a is aligned first and fixed to the fiber unit 21, when the fiber unit 21 is rotated about the center axis for the subsequent alignment of the first lens 11a, the position of the second lens 12a is moved about the center axis with the rotation. As a result, the position of the optical axis of the aligned second lens 12a may be misaligned. Therefore, the first optical element 11 is positioned between the fiber unit 21 and the second optical element 12 to make it possible to align the first lens 11a first and reduce the misalignment of the position of the optical axis of the second lens 12a due to the influence of the alignment of the first lens 11a. Consequently, decrease in the optical coupling efficiency between the SMF 22 and the second optical component can be further reduced.

The second lens 12a is a meniscus lens. Therefore, even if the distance between the second lens 12a and the fiber unit 21 in the Z direction is longer than the distance between the first lens 11a and the fiber unit 21, the size of the beam diameter of the signal beam L1 transmitted through the second lens 12a can be made closer to the size of the beam diameter of the local beam L2 transmitted through the first lens 11a. As a result, decrease in the optical coupling efficiency between the SMF 22 and the second optical component can be further reduced.

The one end surface 2a is provided on the bush 2b positioned on the side wall with the window of the housing 2 and having the V-cut 2c on the outer periphery, and the V-cut 14d, the V-cut 15d and the V-cut 2c are located on a line parallel to the Z direction.

Modified Example

Figure 14:
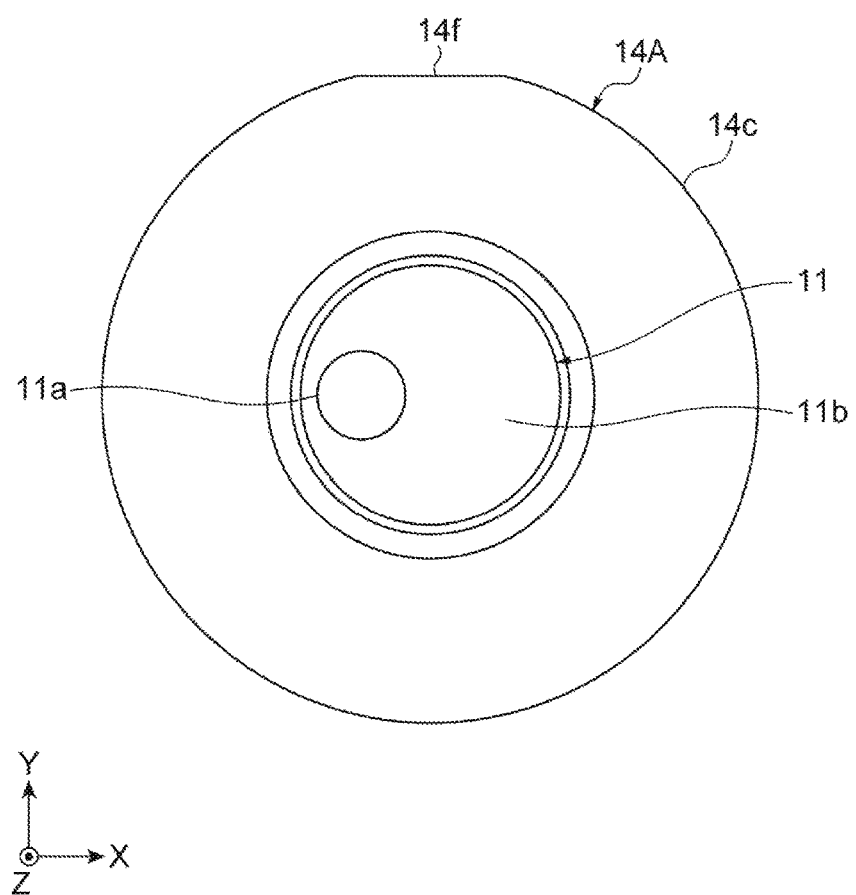
FIG. 14 is a front view illustrating a first lens holder of a modified example.
Figure 15:
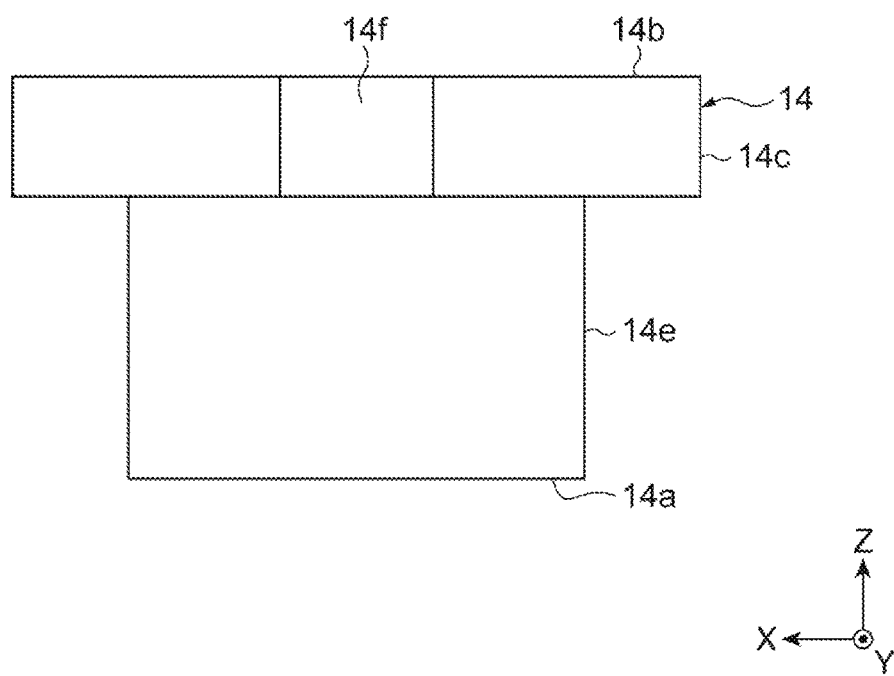
FIG. 15 is a side view illustrating the first lens holder of the modified example.
Figure 16:
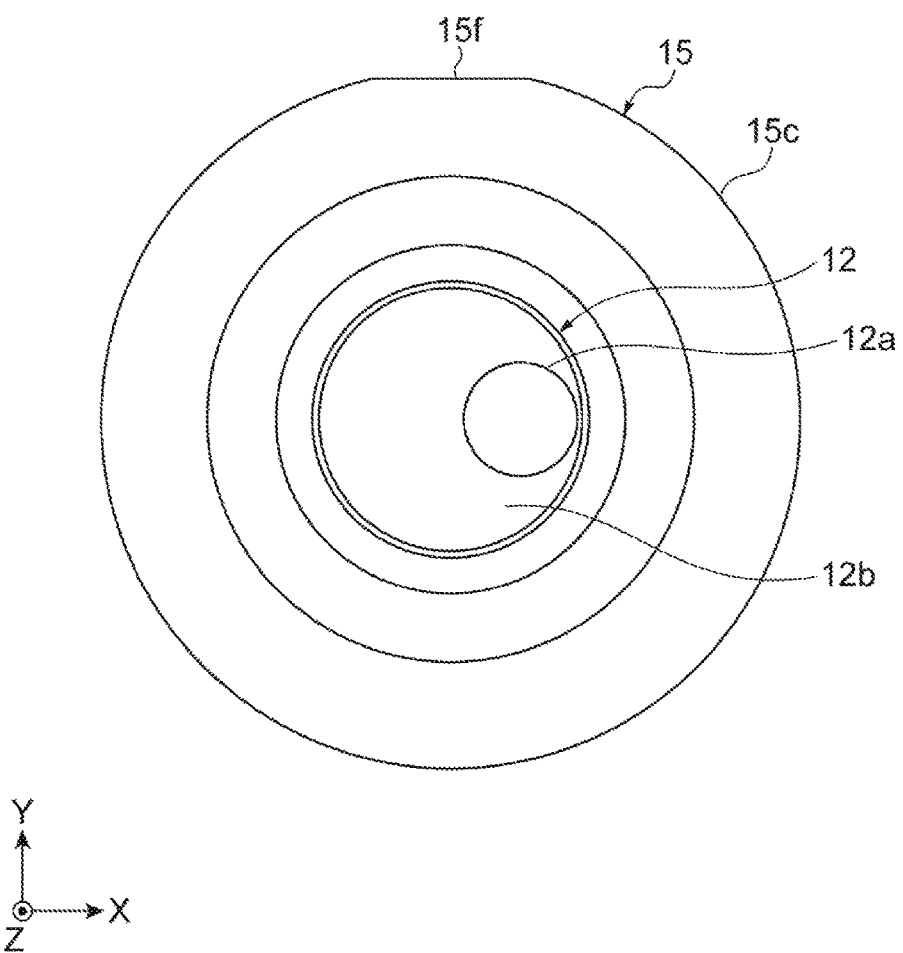
FIG. 16 is a front view illustrating a second lens holder of the modified example.
Figure 17:
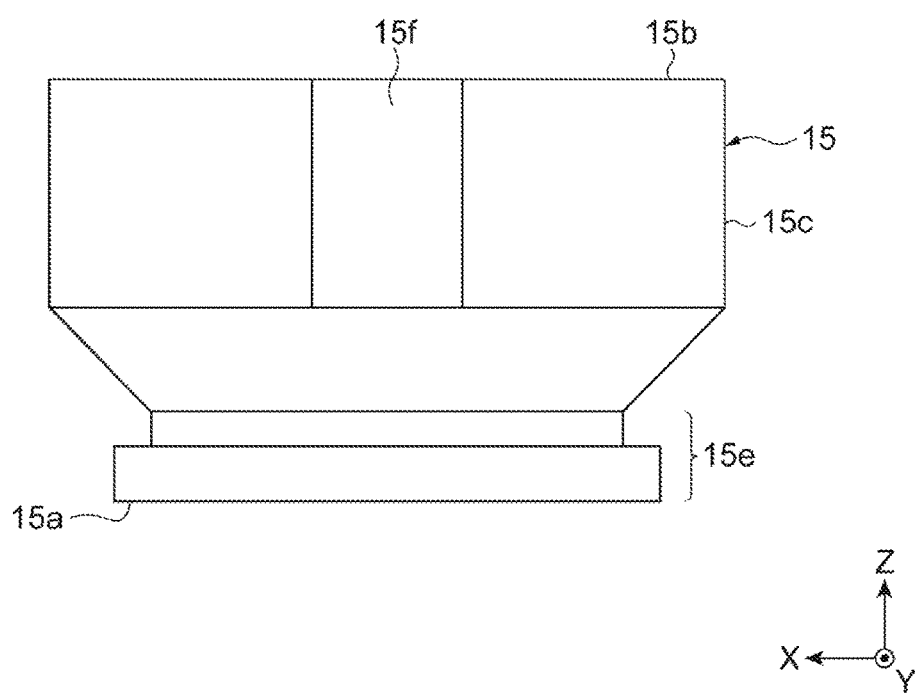
FIG. 17 is a side view illustrating the second lens holder of the modified example.
Figure 18:
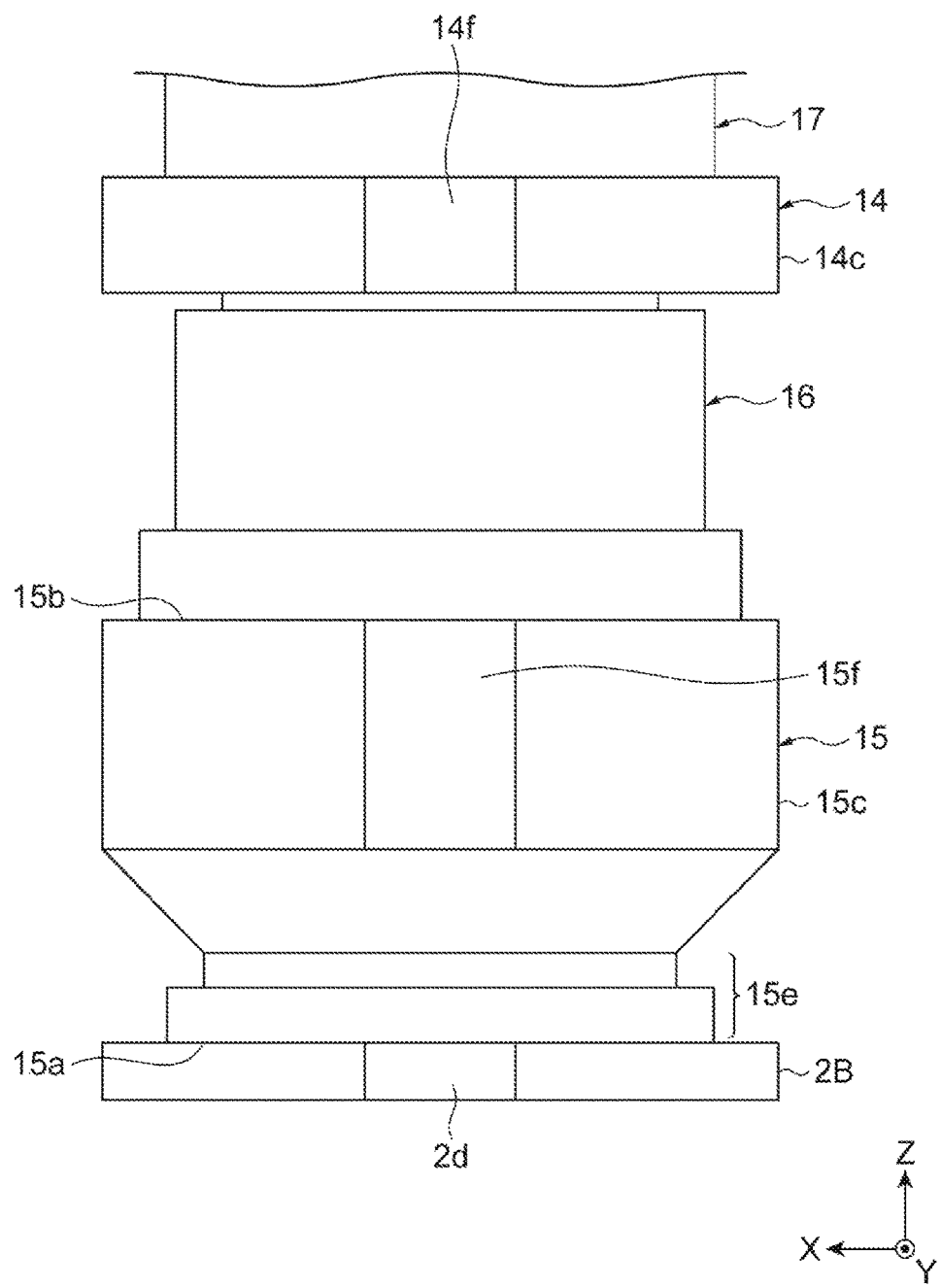
FIG. 18 is a side view illustrating a state in which the first lens holder of the modified example, the second lens holder of the modified example, a coupling sleeve and an aligning sleeve are assembled, and the second lens holder is joined to one end surface.

FIG. 14 is a front view illustrating a first lens holder 14A according to a modified example of the above-described embodiment. FIG. 15 is a side view illustrating the first lens holder 14A according to the modified example. FIG. 16 is a front view illustrating a second lens holder 15A according to the modified example. FIG. 17 is a side view illustrating the second lens holder 15A according to the modified example. FIGS. 14 and 16 are views of the first lens holder 14A and the second lens holder 15A, respectively, as viewed from the Z direction, and FIGS. 15 and 17 are views of the first lens holder 14A and the second lens holder 15A, respectively, as viewed from the Y direction. FIG. 18 is a side view illustrating a state in which the first lens holder 14A, the second lens holder 15A, the coupling sleeve 16 and the aligning sleeve 17 are assembled, and the rear end 15a of the second lens holder 15A is joined to the bush 2b. FIG. 18 is a diagram as viewed from the Y direction.

The difference between this modified example and the above-described embodiment is the shape of the first lens holder 14A, the shape of the second lens holder 15A, and the shape of the bush 2b of the modified example. Specifically, the first lens holder 14A includes an index plane 14f instead of the V-cut 14d, the second lens holder 15A includes an index plane 15f instead of the V-cut 15d, and the bush 2b includes an index plane 2d instead of the V-cut 2c. Each of the index plane 2d, the index plane 14f and the index plane 15f is chamfered in the X-Z plane. In other words, each of the index plane 2d, the index plane 14f and the index plane 15f is a flat surface along the X-Z plane. By defining the relative angle about the center axis of the first optical element 11 with respect to the first lens holder 14 with reference to the position of the index plane 14f, the relative position of the first lens 11a with respect to the first lens holder 14 is defined. Further, by defining the relative angle about the center axis of the second optical element 12 with respect to the second lens holder 15 with reference to the position of the index plane 15f, the relative position of the second lens 12a with respect to the second lens holder 15 is defined.

As illustrated in FIG. 18, each of the index plane 14f and the index plane 15f is located at the same position as the index plane 2d formed on the outer peripheral surface of the bush 2b in the circumferential direction. In other words, each of the index plane 14f, the index plane 15f and the index plane 2d is positioned on a line parallel to the Z direction. The shape of the index plane 14f and the shape of the index plane 15f coincide with the shape of the index plane 2d in the circumferential direction. By making the position of the index plane 14f in the circumferential direction of the first lens holder 14 coincident with the position of the index plane 2d in the circumferential direction of the bush 2b, the relative angle about the center axis of the first lens holder 14 with respect to the bush 2b is defined. Thus, the relative position of the first lens 11a with respect to the bush 2b is defined. Further, by making the position of the index plane 15f in the circumferential direction of the second lens holder 15 coincident with the position of the index plane 2d in the circumferential direction of the bush 2b, the relative angle about the center axis of the second lens holder 15 with respect to the bush 2b is defined. Thus, the relative position of the second lens 12a with respect to the bush 2b is defined.

The coherent optical receiver module and the method for manufacturing the same according to the present invention are not limited to the above-described embodiment, and various other modifications are possible. For example, in the above-described embodiment and modified example, the first lens 11a is formed on the front facet 11b of the first optical element 11, but the first lens 11a may be formed on both of the front and rear facets 11b, 11c of the first optical element.

What is claimed is:

1. A coherent optical receiver module for demodulating information included in a phase-modulated signal beam by causing a local beam to interfere with the signal beam, comprising:

a housing having one end surface that intersects a first direction, the housing storing a first optical component disposed on an optical path of the local beam and a second optical component disposed on an optical path of the signal beam therein;

an optical fiber group disposed to face the end surface, the optical fiber group including a first optical fiber that is optically coupled to the first optical component to propagate the local beam, and a second optical fiber that is optically coupled to the second optical component to propagate the signal beam;

a first optical element having a first lens disposed on the optical path of the local beam outputted from the first optical fiber, the first optical element configured to transmit the signal beam and the local beam therethrough; and a second optical element having a second lens disposed on the optical path of the signal beam outputted from the second optical fiber, the second optical element configured to transmit the signal beam and the local beam therethrough, wherein the first optical element and the second optical element are placed side by side along the first direction between the optical fiber group and the one end surface.

2. The coherent optical receiver module according to claim 1, wherein the first and second lenses are disposed so that optical axes of the first and second lenses do not align with centers of the first and second optical elements.

3. The coherent optical receiver module according to claim 2, wherein a first region in the first optical element opposite to the first lens with respect to the center of the first optical element does not have a lens and is located on an extension line of the optical axis of the second lens.

4. The coherent optical receiver module according to claim 2, wherein a second region in the second optical element opposite to the second lens with respect to the center of the second optical element does not have a lens and is located on an extension line of the optical axis of the first lens.

5. The coherent optical receiver module according to claim 2, wherein a first region in the first optical element opposite to the first lens with respect to the center of the first optical element defines a plane area and is located on an extension line of the optical axis of the second lens.

6. The coherent optical receiver module according to claim 2, wherein a second region in the second optical element opposite to the second lens with respect to the center of the second optical element defines a plane area and is located on an extension line of the optical axis of the first lens.

7. The coherent optical receiver module according to claim 1, wherein the first optical element is located between the optical fiber group and the second optical element in the first direction.

8. The coherent optical receiver module according to claim 1, wherein the second lens includes a meniscus lens.

9. The coherent optical receiver module according to claim 1, wherein the second optical element includes a surface facing the end surface of the housing, the surface of the second optical element being provided with a concave surface of the second lens.

10. The coherent optical receiver module according to claim 1, further comprising a first holder that holds the first optical element and a second holder that holds the second optical element.

11. The coherent optical receiver module according to claim 10,
wherein the housing includes a bush that arranged adjacent to a side wall of the housing wherein the side wall has a window, and the bush is provided with the end surface, and
wherein the first holder has a first positioning portion on an outer periphery, the second holder has a second positioning portion on an outer periphery and the bush has a third positioning portion on an outer periphery, and the first positioning portion, the second positioning portion and the third positioning portion are aligned on a line parallel to the first direction.

12. The coherent optical receiver module according to claim 10
wherein the first holder includes a cut or an index plane on an outer periphery, and the second holder includes a cut or an index plane on an outer periphery, and
wherein the cut or the index plane of the first holder aligns with the cut or the index plane of the second holder.

13. The coherent optical receiver module according to claim 12
wherein the housing includes a bush that arranged adjacent to a side wall of the housing wherein the side wall has a window, and the bush is provided with the end surface, and the bush includes a cut or an index plane on an outer periphery, and
wherein the cut or the index plane of the first holder, the cut or the index plane of the second holder, and the cut or the index plane of the bush are aligned on a line parallel to the first direction.

14. A method for manufacturing a coherent optical receiver module, comprising:
preparing a housing having one end surface, an optical fiber group including a first optical fiber configured to propagate a local beam and a second optical fiber configured to propagate a signal beam, a first optical element having a first lens, and a second optical element having a second lens;
positioning the first optical element between the end surface of the housing and the optical fiber group to align the first lens of the first optical element with an optical axis of the first optical fiber;
fixing the first optical element to the optical fiber group;
positioning the second optical element between the end surface and the first optical element to align the second lens of the second optical element with an optical axis of the second optical fiber, and
fixing the second optical element to the first optical element and the end surface of the housing.

15. The method for manufacturing a coherent optical receiver module according to claim 14,
wherein in preparing, a first holder that holds the first optical element therein is prepared together with the first optical element, a second holder that holds the second optical element therein is prepared together with the second optical element,
wherein the housing is provided with a bush adjacent to a side wall of the housing, and the first and second holders and the bush each having a cut or an index plane,
wherein in positioning the first optical element,
the cut or the index plane of the first holder is aligned with the cut or the index plane of the bush, and in positioning the second optical element, the cut or the index plane of the second holder is aligned with the cut or the index plane of the bush.

* * * * *